United States Patent
Pawar et al.

(10) Patent No.: US 11,139,876 B2
(45) Date of Patent: Oct. 5, 2021

(54) SIGNALING OF A CHANNEL STATE INFORMATION REFERENCE SIGNAL (CSI-RS) MAPPING CONFIGURATION FOR A NEW RADIO (NR) SYSTEM

(71) Applicant: APPLE INC., Cupertino, CA (US)

(72) Inventors: Sameer Pawar, Santa Clara, CA (US); Alexei Davydov, Nizhny Novgorod (RU)

(73) Assignee: APPLE INC., Cupertino, CA (US)

( * ) Notice: Subject to any disclaimer, the term of this patent is extended or adjusted under 35 U.S.C. 154(b) by 110 days.

(21) Appl. No.: 16/463,953

(22) PCT Filed: May 7, 2018

(86) PCT No.: PCT/US2018/031440
§ 371 (c)(1),
(2) Date: May 24, 2019

(87) PCT Pub. No.: WO2018/204931
PCT Pub. Date: Nov. 8, 2018

(65) Prior Publication Data
US 2020/0382190 A1   Dec. 3, 2020

Related U.S. Application Data

(60) Provisional application No. 62/588,256, filed on Nov. 17, 2017, provisional application No. 62/578,199, (Continued)

(51) Int. Cl.
*H04B 7/06* (2006.01)
*H04L 1/16* (2006.01)
(Continued)

(52) U.S. Cl.
CPC ......... *H04B 7/0626* (2013.01); *H04L 1/1614* (2013.01); *H04L 5/0051* (2013.01);
(Continued)

(58) Field of Classification Search
CPC ... H04B 7/0626; H04L 1/1614; H04L 5/0051; H04W 72/0446
See application file for complete search history.

(56) References Cited

U.S. PATENT DOCUMENTS

2011/0176581 A1* 7/2011 Thomas ................ H04L 5/0026
375/146
2011/0176634 A1* 7/2011 Yoon .................... H04L 5/0048
375/295

(Continued)

FOREIGN PATENT DOCUMENTS

WO   WO 2018060974 A1   4/2018

OTHER PUBLICATIONS

AT&T "CSI-RS Design for Mixed Numerology Support in NR;" 3GPP TSG R1-1612367; (Nov. 14-18, 2016); 7 pages; RAN WG1 #87, Reno, USA; (Agenda 7.1.3.2).

(Continued)

Primary Examiner — Jael M Ulysse

(57) ABSTRACT

Technology for a Next Generation NodeB (gNB) operable to communicate a channel state information reference signal (CSI-RS) resource element (RE) mapping configuration to a user equipment (UE) is disclosed. The gNB can determine a CSI-RS RE mapping configuration that 5 identifies resource elements for a CSI-RS resource at a frequency domain location (k) and at a time domain location (l). The gNB can encode the CSI-RS RE mapping configuration for transmission to the UE via higher layer signaling.

22 Claims, 13 Drawing Sheets

Related U.S. Application Data filed on Oct. 27, 2017, provisional application No. 62/544,636, filed on Aug. 11, 2017, provisional application No. 62/502,531, filed on May 5, 2017.

(51) Int. Cl.
*H04L 5/00* (2006.01)
*H04W 72/04* (2009.01)
*H04W 72/12* (2009.01)
*H04W 80/08* (2009.01)

(52) U.S. Cl.
CPC ... *H04W 72/0446* (2013.01); *H04W 72/0453* (2013.01); *H04W 72/1263* (2013.01); *H04W 80/08* (2013.01)

(56) References Cited

U.S. PATENT DOCUMENTS

| | | | | |
|---|---|---|---|---|
| 2011/0194551 A1* | 8/2011 | Lee | H04B 7/0626 | 370/342 |
| 2012/0287875 A1* | 11/2012 | Kim | H04W 76/27 | 370/329 |
| 2014/0092827 A1* | 4/2014 | Jongren | H04L 25/0222 | 370/329 |
| 2015/0163008 A1* | 6/2015 | Kim | H04L 5/0048 | 370/252 |
| 2015/0215905 A1* | 7/2015 | Park | H04W 76/00 | 370/329 |
| 2015/0229452 A1* | 8/2015 | Nagata | H04L 5/0073 | 370/252 |
| 2016/0013906 A1* | 1/2016 | Guo | H04L 5/0073 | 370/329 |
| 2016/0248562 A1* | 8/2016 | Nam | H04L 5/0051 | |
| 2016/0278003 A1* | 9/2016 | Kim | H04L 5/00 | |
| 2016/0337178 A1* | 11/2016 | Frenne | H04L 41/0803 | |
| 2017/0257853 A1* | 9/2017 | Park | H04W 72/046 | |
| 2018/0054290 A1* | 2/2018 | Park | H04L 5/005 | |
| 2018/0234278 A1* | 8/2018 | Xu | H04L 5/005 | |
| 2018/0262252 A1* | 9/2018 | Oh | H04L 5/005 | |
| 2019/0181936 A1* | 6/2019 | Park | H04L 5/0005 | |
| 2019/0191444 A1* | 6/2019 | Park | H04B 7/0626 | |

OTHER PUBLICATIONS

NEC; "Proposals for Non-Precoded CSI-RS with CDM8;" 3GPP TSG R1-1611713; (Nov. 14-18, 2016); 3 pages; RAN WG1 Meeting #87, Reno, USA; (Agenda 6.2.2.3).

MCC Support; "Final Report of 3GPP TSG RAN WG1 #88 v1.0.0 (Athens, Greece, Feb. 13-17, 2017);" 3GPP TSG R1-1704172; (Apr. 3-7, 2017); 153 pages; RAN WG1 Meeting #88bis, Spokane, USA.

MCC Support; "Final Report of 3GPP TSG RAN WG1 #88bis v1.0.0 (Spokane, USA, Apr. 3-7, 2017);" 3GPP TSG R1-1708890; (May 15-19, 2017); 154 pages; RAN WG1 Meeting #89, Hangzhou, China.

International Search Report dated Aug. 17, 2018, in International Application No. PCT/US2018/031440, filed May 7, 2018; 4 pages.

* cited by examiner

| | | | | | |
|---|---|---|---|---|---|
| 1 | 0 | 1 | 0 | 1 | 0 |
| 1 | 0 | 1 | 0 | 1 | 0 |
| 0 | 0 | 0 | 0 | 0 | 0 |
| 0 | 0 | 0 | 0 | 0 | 0 |
| 0 | 0 | 0 | 0 | 0 | 0 |
| 0 | 0 | 0 | 0 | 0 | 0 |
| 0 | 0 | 0 | 0 | 0 | 0 |
| 1 | 0 | 1 | 0 | 1 | 0 |
| 1 | 0 | 1 | 0 | 1 | 0 |
| 0 | 0 | 0 | 0 | 0 | 0 |
| 0 | 0 | 0 | 0 | 0 | 0 |
| 0 | 0 | 0 | 0 | 0 | 0 |
| 0 | 0 | 0 | 0 | 0 | 0 |

FIG. 5

SIGNALING OF A CHANNEL STATE INFORMATION REFERENCE SIGNAL (CSI-RS) MAPPING CONFIGURATION FOR A NEW RADIO (NR) SYSTEM

BACKGROUND

Wireless systems typically include multiple User Equipment (UE) devices communicatively coupled to one or more Base Stations (BS). The one or more BSs may be Long Term Evolved (LTE) evolved NodeBs (eNB) or New Radio (NR) next generation NodeBs (gNB) that can be communicatively coupled to one or more UEs by a Third-Generation Partnership Project (3GPP) network.

Next generation wireless communication systems are expected to be a unified network/system that is targeted to meet vastly different and sometimes conflicting performance dimensions and services. New Radio Access Technology (RAT) is expected to support a broad range of use cases including Enhanced Mobile Broadband (eMBB), Massive Machine Type Communication (mMTC), Mission Critical Machine Type Communication (uMTC), and similar service types operating in frequency ranges up to 100 GHz.

BRIEF DESCRIPTION OF THE DRAWINGS

Features and advantages of the disclosure will be apparent from the detailed description which follows, taken in conjunction with the accompanying drawings, which together illustrate, by way of example, features of the disclosure; and, wherein:

FIG. 5 illustrates a frequency and time map in accordance with an example;

Figure 1:
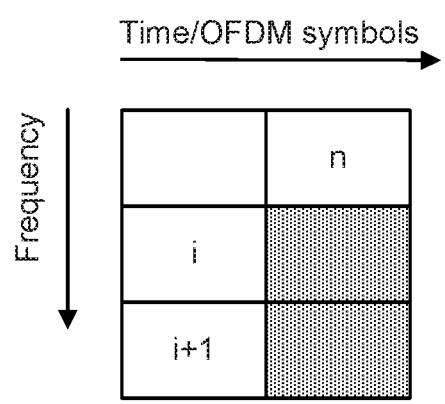
FIG. 1 illustrates a resource element (RE) pattern in accordance with an example.

Reference will now be made to the exemplary embodiments illustrated, and specific language will be used herein to describe the same. It will nevertheless be understood that no limitation of the scope of the technology is thereby intended.

DETAILED DESCRIPTION

Before the present technology is disclosed and described, it is to be understood that this technology is not limited to the particular structures, process actions, or materials disclosed herein, but is extended to equivalents thereof as would be recognized by those ordinarily skilled in the relevant arts. It should also be understood that terminology employed herein is used for the purpose of describing particular examples only and is not intended to be limiting. The same reference numerals in different drawings represent the same element. Numbers provided in flow charts and processes are provided for clarity in illustrating actions and operations and do not necessarily indicate a particular order or sequence.

Definitions

As used herein, the term "User Equipment (UE)" refers to a computing device capable of wireless digital communication such as a smart phone, a tablet computing device, a laptop computer, a multimedia device such as an iPod Touch®, or other type computing device that provides text or voice communication. The term "User Equipment (UE)" may also be referred to as a "mobile device," "wireless device," of "wireless mobile device."

As used herein, the term "Base Station (BS)" includes "Base Transceiver Stations (BTS)," "NodeBs," "evolved NodeBs (eNodeB or eNB)," and/or "next generation NodeBs (gNodeB or gNB)," and refers to a device or configured node of a mobile phone network that communicates wirelessly with UEs.

As used herein, the term "cellular telephone network," "4G cellular," "Long Term Evolved (LTE)," "5G cellular" and/or "New Radio (NR)" refers to wireless broadband technology developed by the Third Generation Partnership Project (3GPP).

Example Embodiments

An initial overview of technology embodiments is provided below and then specific technology embodiments are described in further detail later. This initial summary is intended to aid readers in understanding the technology more quickly but is not intended to identify key features or essential features of the technology nor is it intended to limit the scope of the claimed subject matter.

Mobile communication has evolved significantly from early voice systems to today's highly sophisticated integrated communication platform. The next generation wireless communication system, Fifth Generation (5G), or New Radio (NR) access technology can provide access to information and the sharing of data by various users and applications. NR is expected to be a unified network/system that is targeted to meet vastly different and sometimes conflicting performance dimensions and services. Such diverse multi-dimensional specifications are driven by different services and applications. In general, NR will evolve based on 3GPP LTE-Advanced with additional potential new Radio Access Technologies (RATs) to provide improved, simple and seamless wireless connectivity solutions. NR can enable increased wireless connectivity and deliver fast, rich content and services.

In one configuration, a Next Generation NodeB (gNB) can configure a channel state information reference signal (CSI-RS) resource element (RE) mapping for a user equipment (UE). For example, the gNB can determine a CSI-RS RE mapping configuration that identifies resource elements for a CSI-RS resource at a frequency domain location (k) and at a time domain location (l). The resource elements can be within resource blocks occupied by the CSI-RS resource which is configured for the UE. The gNB can transmit the CSI-RS RE mapping configuration to the UE via higher layer signaling, e.g., radio resource control (RRC) signaling. The UE can receive the CSI-RS RE mapping configuration from the gNB. Based on the CSI-RS RE mapping configuration, the UE can decode a CSI-RS received from the gNB. In other words, the gNB can transmit the CSI-RS using the CSI-RS resource defined by the CSI-RS RE mapping configuration, and the UE is configured to decode the CSI-RS based on the received CSI-RS RE mapping configuration.

In one example, the CSI-RS resource can occupy identical frequency domain resources in occupied orthogonal frequency division multiplexing (OFDM) symbols. In another example, the CSI-RS RE mapping configuration can include a bitmap that indicates the frequency domain location of the CSI-RS resource, where the bitmap can be provided by a CSI-RS resource mapping (CSI-RS-ResourceMapping) higher-layer parameter in the CSI-RS RE mapping configuration. In addition, the bitmap can be formed using a number of bits that is reduced based on an actual number of symbols used for the transmission of the CSI-RS to the UE.

In one example, the gNB can transmit the CSI-RS to the UE in accordance with a code division multiplexing (CDM) group with a size selected from a set of $\{1, 2, 4, 8\}$. The CDM group can be limited to co-located REs in the frequency domain and the time domain. In another example, the gNB can identify the resource elements for the CSI-RS resource, where a CSI-RS code division multiplexing (CDM)-8 (CDM-8) can be applied using two frequency domain resource elements (FD2) and four time domain resource elements (TD4) when a number of antenna ports is equal to 32. The two frequency domain resource elements (FD2) can be adjacent and the four time domain resource elements (TD4) can be adjacent. In addition, the CSI-RS RE mapping configuration can be for up to 32 antenna ports.

In one example, the CSI-RS RE mapping configuration can include an indication of sub-bands which are configured for the transmission of the CSI-RS to the UE. In another example, the CSI-RS RE mapping configuration can include a second bitmap that indicates a time-domain location of the CSI-RS resource, where the second bitmap can be provided by a CSI-RS resource mapping (CSI-RS-ResourceMapping) higher-layer parameter in the CSI-RS RE mapping configuration. In yet another example, the gNB can transmit an indication of a code division multiplexing (CDM) type to the UE, where the CDM type can include two bits for a frequency domain CDM value from a set of $\{1, 2, 4, 8\}$ and two bits for a time domain CDM value from the set of $\{1, 2, 4, 8\}$.

Channel State Information Reference Signal (CSI-RS) Support for a Multiple-Input Multiple-Output System In one configuration, Fifth Generation (5G) New Radio (NR) channel state information reference signals (CSI-RS) can be supported in a multiple-input multiple-output (MIMO) system for up to 32 antenna ports. Resource element (RE) patterns used for an X-port (where X can be up to 32) CSI-RS resource can include one or multiple component CSI-RS RE patterns (CCRP). A component CSI-RS RE pattern (CCRP) can be defined within a single physical resource block (PRB) as Y adjacent REs in a frequency domain and Z adjacent REs in a time domain, where Y and Z are positive integers.

The present technology describes CSI-RS RE patterns, code division multiplexing (CDM) options (e.g., CDM grouping for a CSI-RS up to 32 antenna ports) and signaling of configured CSI-RS RE patterns from a base station to a user equipment (UE). For example, in one configuration, component RE patterns can be defined for a CSI-RS resource for 2, 3 or 8 antenna ports, and then aggregation of one or more component RE patterns can be used to define RE patterns for a CSI-resource with 12, 16, 20, 24, 28 or 32 antenna ports. In addition, CDM grouping can be based on aggregation for the CSI-RS resource with a higher number of antenna ports.

In one configuration, with respect to a component CSI-RS RE pattern that is defined as (Y, Z), where Y represents adjacent REs in the frequency domain and Z represents adjacent REs in the time domain, a small number of component RE patterns along with aggregation can provide a flexible CSI-RS resource RE pattern, thereby enabling an efficient utilization of CSI-RS for diverse NR objectives. However, the usage of aggregation can increase gNB and UE complexity due to an increased number of feasible combinations and permutations of aggregated RE patterns. On the other hand, individual RE patterns for each X-port CSI-RS resource can be too restrictive in terms of flexibility. Thus, the goal is to have sufficient flexibility in the RE patterns without overwhelming complexity.

In one example, for a density of 1 RE/port/PRB, various candidate RE patterns can be used. For example, with respect to an RE pattern for X=2 ports for N=1 OFDM symbol, a component CSI-RS RE pattern can be represented as (2,1), where Y is equal to 2 adjacent REs in the frequency domain and Z is equal to one adjacent RE in the time domain. As another example, with respect to an RE pattern for X=4 ports for N=1 OFDM symbol, a component CSI-RS RE pattern can be represented as (4,1), where Y is equal to 4 adjacent REs in the frequency domain and Z is equal to one adjacent RE in the time domain. As yet another example, with respect to an RE pattern for X=4 ports for N=2 OFDM symbols, a component CSI-RS RE pattern can be represented as (2,2), where Y is equal to 2 adjacent REs in the frequency domain and Z is equal to 2 adjacent REs in the time domain. The time domain can span from n, n+1, n+2, and so on, and the frequency domain can span from i, i+1, i+2, and so on.

FIG. 1 illustrates an example of a resource element (RE) pattern. In this example, with respect to an RE pattern for X=2 ports for N=1 OFDM symbol, a component CSI-RS RE pattern can be represented as (2,1), where Y is equal to 2 adjacent REs in the frequency domain and Z is equal to one adjacent RE in the time domain. The time domain can span include n, and the frequency domain can include i and i+1.

Figure 2A:
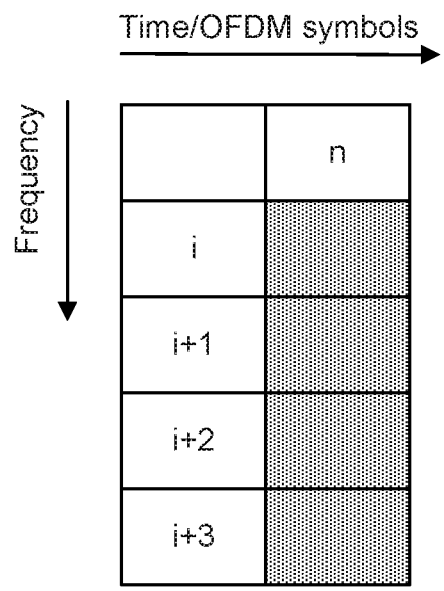
FIGS. 2A and 2B illustrate resource element (RE) patterns in accordance with an example.
Figure 2B:
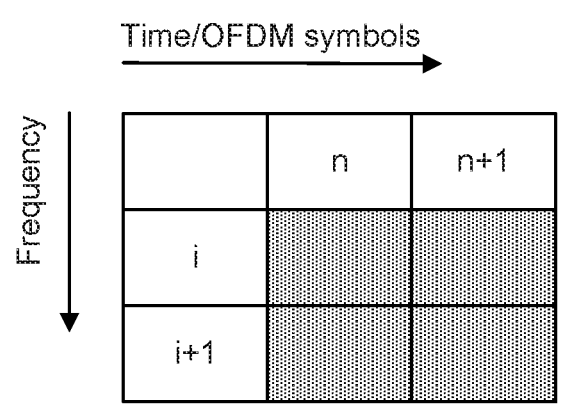

FIGS. 2A and 2B illustrate examples of resource element (RE) patterns. In FIG. 2A, with respect to an RE pattern for X=4 ports for N=1 OFDM symbol, a component CSI-RS RE pattern can be represented as (4,1), where Y is equal to 4 adjacent REs in the frequency domain and Z is equal to one adjacent RE in the time domain. The time domain can include n and the frequency domain can span from i to i+3. In FIG. 2B, with respect to an RE pattern for X=4 ports for N=2 OFDM symbols, a component CSI-RS RE pattern can be represented as (2,2), where Y is equal to 2 adjacent REs in the frequency domain and Z is equal to 2 adjacent REs in the time domain. The time domain can include n and n+1 and the frequency domain can include i and i+1.

In one configuration, when constructing an X=8 port CSI-RS resource by aggregating RE patterns (component RE pattern) corresponding to the X=4 port CSI-RS resource, then for N=2 alone, there can be 18 possible patterns using (Y, Z)=(4, 1), and 15 possible patterns using (Y, Z)=(2, 2).

There can be even more possible aggregated RE patterns when aggregation is performed using (Y, Z)=(2, 1). Therefore, to limit the number of possibilities to a reasonable number and aggregated patterns to a reasonable shape, an X=8 port CSI-RS resource pattern can be defined, which can allow for aggregated RE patterns for X>8 port CSI-RS resources.

Figure 3A:
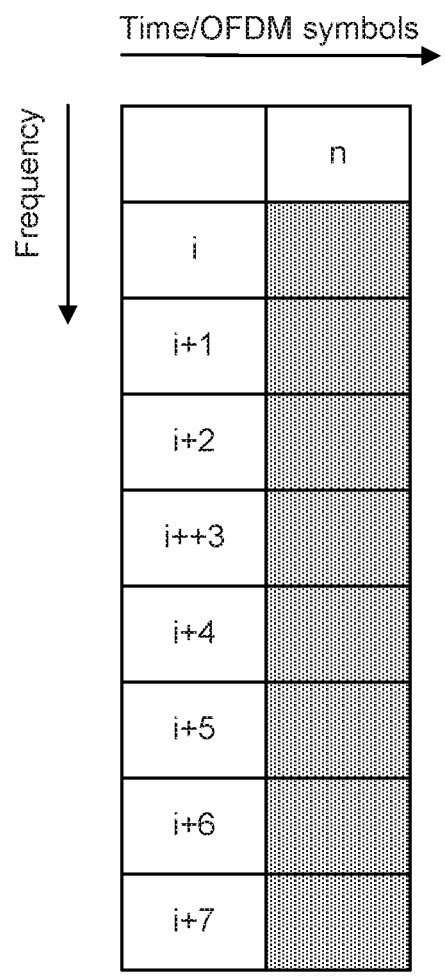
FIGS. 3A, 3B and 3C illustrate resource element (RE) patterns in accordance with an example.
Figure 3B:
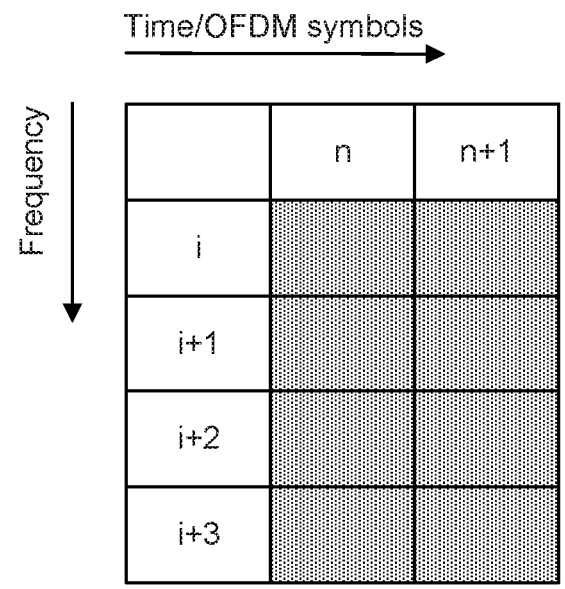
Figure 3C:
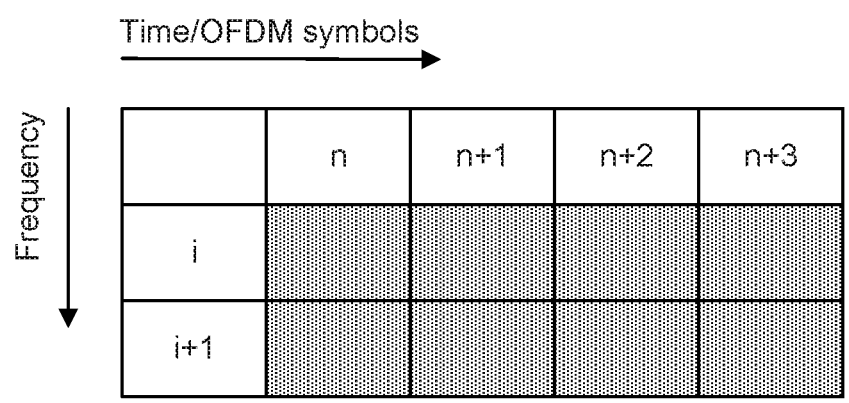

FIGS. 3A, 3B and 3C illustrate examples of resource element (RE) patterns. In FIG. 3A, with respect to an RE pattern for X=8 ports for N=1 OFDM symbol, a component CSI-RS RE pattern can be represented as (8,1), where Y is equal to 1 adjacent REs in the frequency domain and Z is equal to one adjacent RE in the time domain. The time domain can include n and the frequency domain can span from i to i+7. In FIG. 3B, with respect to an RE pattern for X=8 ports for N=2 OFDM symbols, a component CSI-RS RE pattern can be represented as (4,2), where Y is equal to 4 adjacent REs in the frequency domain and Z is equal to 2 adjacent REs in the time domain. The time domain can include n and n+1 and the frequency domain can span from i to i+3. In FIG. 3C, with respect to an RE pattern for X=8 ports for N=4 OFDM symbols, a component CSI-RS RE pattern can be represented as (2,4), where Y is equal to 2 adjacent REs in the frequency domain and Z is equal to 4 adjacent REs in the time domain. The time domain can span from n to n+3 and the frequency domain can include i and i+1.

In one configuration, with respect to a CSI-RS RE pattern for an X>8 port CSI-RS resource, an RE pattern used for large (e.g., greater than 8) port CSI-RS resources can be formed using one or more component RE patterns (as illustrated in FIG. 1 and FIGS. 2A and 2B and FIGS. 3A, 3B and 3C) for X=2, 4, 8 port CSI-RS resources. From a CSI acquisition as well as a complexity perspective, it can be beneficial to have only one type of RE pattern (e.g., one value of (Y, Z)) that is aggregated, and that occupies identical frequency domain resources in all occupied OFDM symbols.

In one configuration, with respect to CDM RE grouping, for improved estimation performance of the CSI, considering the frequency selective nature of a channel, a CDM group can be limited to frequency and time domain co-located REs. In addition, the CDM group can include no more than two REs in the frequency domain and no more than four REs in the time domain, and supported CDM lengths can be 2, 4 or 8.

In one configuration, a technique for supporting transmission and measurement of CSI-RS at a gNB and a UE is described. The technique can include antenna port mapping and processing of the CSI-RS at the gNB. The gNB can signal to the UE information about transmission parameters of the CSI-RS. The technique can include processing the CSI-RS according to received CSI-RS configuration parameters from the gNB at the UE.

In one example, CSI-RS transmission and measurement can be supported for up to 32 antenna ports, e.g., 1, 2, 4, 8, 12, 16, 20, 24, 28, or 32 antenna ports. In another example, CSI-RS resource RE patterns for 2 and 4 antenna ports can be defined and can be referred to as component CSI-RS RE patterns (CCRP). In yet another example, RE patterns for 8, 12, 16, 20, 24, 28 and 32 antenna port CSI-RS resources can be constructed using aggregation of two or more component CSI-RS RE patterns. In a further example, aggregation of RE patterns can be performed across only one type of component CSI-RS RE pattern. In yet a further example, aggregated RE patterns can occupy identical frequency domain resources in all occupied OFDM symbols.

In one example, RS transmissions from different antenna ports can be spread and combined together using an orthogonal cover code (OCC). In another example, a length of the OCC used can be 2, 4 or 8. In yet another example, the OCC can be applied to a group of antenna ports belonging to multiple component CSI-RS RE patterns. In a further example, the OCC can be applied to no more than 2 adjacent REs in the frequency domain. In yet a further example, the OCC can be applied to a group of antenna ports belonging to multiple component CSI-RS RE patterns.

CSI-RS for CSI RE Pattern and Signaling in an NR System

In the present technology, an indication of an RE pattern can be separated based on a number of aggregated component CSI-RS RE patterns (CCRP). When there is no aggregation, a starting position of the only CCRP used in the CSI-RS RE pattern can be indicated. For the case in which more than CCRP is aggregated to form a total RE pattern, a 12-bit bitmap can be used to indicate starting positions of the individual CCRPs. The 12-bit bitmap, along with the notion that uniform RE patterns are occupied across multiple OFDM symbols, can be sufficient to identify an RE pattern used for a configured X-port CSI-RS resource.

In one configuration, with respect to signaling of an RE pattern for a CSI-RS resource with X=2 and 4, for X=2, 4 and N=1, one type of CCRP can be used, e.g., (Y, Z)=(2, 1) and (4, 1) respectively. Hence, the RE pattern can be signaled using 4 bits for a starting position of the CCRP in a PRB.

In one configuration, with respect to signaling of an RE pattern for a CSI-RS resource with X>4, for an X>4 port CSI-RS resource, the RE pattern can be constructed by aggregating more than one CCRP corresponding to either (Y, Z)=(2, 1), or (2, 2). The type of CCRP used for the aggregation can be indirectly indicated by the value N of the number of OFDM symbols occupied by the CSI-RS resource. An actual RE pattern then can be signaled using a 12-bit bitmap that has "1" at locations that correspond to a starting sub-carrier for each of the CCRP. For example, for X=8, N=2, the type of CCRP (Y, Z)=(2, 2). There can be 45 possible options, even when considering a uniform RE pattern across the N=2 symbols. The used option can be specified using a 12-bit bitmap that contains two non-zero values indicating a starting sub-carrier position for each of the (2, 2) CCRP.

In one configuration, with respect to CDM grouping of CSI-RS antenna ports, in a conventional wireless system, CSI-RS corresponding to different antenna ports can be spread across multiple time and frequency resource elements to exploit processing gain as well as power boosting in order to obtain improved CSI estimation performance. In the NR system, an X>4 port CSI-RS resource can be constructed using CCRP (Y, Z)=(2, 1) and (2, 2). Hence, for instance when X=12 and N=1, the CCRP can consist of (2, 1), in which case for full power utilization CDM-4 using grouping of antenna ports across two CCRP can be considered. Similarly, for X=32 ports, antenna ports can be grouped across different CCRP to apply CDM-8 using frequency division 2 (FD-2) and time division 4 (TD-4).

In one configuration, with respect to bitmap based signaling, the indication of CSI-RS component patterns can be performed using two bitmaps. A first bitmap can indicate a position of the CSI-RS component in the frequency domain and a second bitmap can indicate a position of the CSI-RS component in the time domain. In one example, a length of the first bitmap can be 12 bits and a length of the second bitmap can be 14 bits in accordance with a number of subcarriers and symbols in a slot. In another example, a bitmap length can be reduced by accounting for an actual number of symbols in which the CSI-RS can be transmitted. In particular, when CSI-RS transmission is only allowed on symbols from 5 to 14, the length of the second bitmap can be reduced from 14 bits to 10 bits. In yet another example, when a CSI-RS component has a granularity of Y subcarriers in the frequency domain, the length of the first bitmap can be reduced to 12/Y bits.

In one configuration, a technique for supporting transmission and measurement of CSI-RS at a gNB and a UE is described. In one example, an RE pattern for X=2 and 4 can be specified using 4 bits for a starting sub-carrier position for a used CCRP. In another example, an RE pattern for X>4 ports can be specified by a 12-bit bitmap, where non-zero bit positions can indicate starting sub-carriers for individual CCRPs.

In one example, a CSI-RS resource can consist of one or more CSI-RS component patterns. In another example, a presence of a CSI-RS component in a slot can be indicated using two bitmaps, where a first bitmap can indicate a position of the CSI-RS component in the frequency domain and a second bitmap can indicate a position of the CSI-RS component in the time domain. In yet another example, a length of the first bitmap can be 12 bits and a length of the second bitmap can be 14 bits in accordance with a number of subcarriers and symbols in a slot. In a further example, a bitmap can only consider symbols in which CSI-RS can be transmitted, thereby reducing a number of bits used in the bitmap. In yet a further example, when a CSI-RS component has a granularity of Y subcarriers in the frequency domain, the number of bits in the first bitmap can be 12/Y.

Radio Resource Control (RRC) Parameters for CSI-RS for a NR System

In one configuration, a MIMO system can rely on a plurality of transmit (Tx) and receive (Rx) antennas to provide spatial diversity, multiplexing and array gains in downlink and uplink channels. In the downlink, the Tx can improve performance by using channel state information (CSI) about a downlink channel observed by the Rx. The CSI can be obtained by the Tx from the Rx from estimation of the uplink channel and by using channel reciprocity of a wireless channel, or alternatively, from quantized feedback measured by the Rx.

In one example, CSI-RS are reference signal introduced to support channel measurement for CSI calculation. For NR Rel-15, various parameters, such as the functionality, number of ports supported for CSI-RS, density of the CSI-RS in terms of resource element (RE) per configured PRB per CSI-RS antenna port, etc. have been considered, but there are additional parameters related to CSI-RS resource configuration that have not been considered.

The present technology describes details of radio resource control (RRC) parameters related to the CSI-RS configuration for an NR system. To support CSI-RS in Rel-15 NR, a detail design is considered for the following RRC parameters related to the CSI-RS configuration for NR: a CSI-RS resource mapping parameter (CSI-RS-ResourceMapping), a CSI-RS CDM type parameter (CSI-RS-CDMType) and a CSI-RS frequency band parameter (CSI-RS-FreqBand). The CSI-RS resource mapping parameter can include parameters to capture OFDM symbol location(s) in a slot and subcarrier occupancy in a PRB of the CSI-RS resource. The CDM type parameter can indicate a type of CDM. The CSI-RS frequency band parameter can include parameters to enable configuration of a wideband and partial band CSI-RS.

In one configuration, with respect to the CSI-RS resource mapping parameter, RE patterns for an X-port CSI-RS can be comprised of one or multiple component CSI-RS RE patterns (Y, Z). A component CSI-RS RE pattern can be defined within a single PRB as Y adjacent REs in the frequency domain and Z adjacent REs in the time domain. In one example, three distinct pairs of (Y, Z)={(2,1), (2, 2), (4, 1)} can be supported. In order to rule out undesirable RE patterns for CSI-RS resources, a uniform RE mapping pattern can be supported for CSI acquisition in which the same sub-carriers can be occupied in all the symbols in a CSI-RS resource. In addition, a starting (lower index) sub-carrier position of a (Y, Z) component within a PRB can be a multiple of Y.

In one example, using these constraints of resource mapping, a RE resource mapping pattern of a CSI-RS resource can be signaled via RRC using an outer or Kronecker product of two independent bitmaps for frequency and time respectively. Specifically, since frequency positions can be uniform across all symbols in a resource and can start at sub-carrier indices that are multiples of Y, a 12/Y bit bitmap can be used to specify the frequency pattern. A '1' in the bitmap can correspond to the start of a (Y, Z) component. Similarly, a 14-bit bitmap can be used to specify which time-domain symbols contain the CSI-RS resource. Again, "1"s or set bits can indicate the presence of the CSI-RS symbols in a slot.

Figure 4:
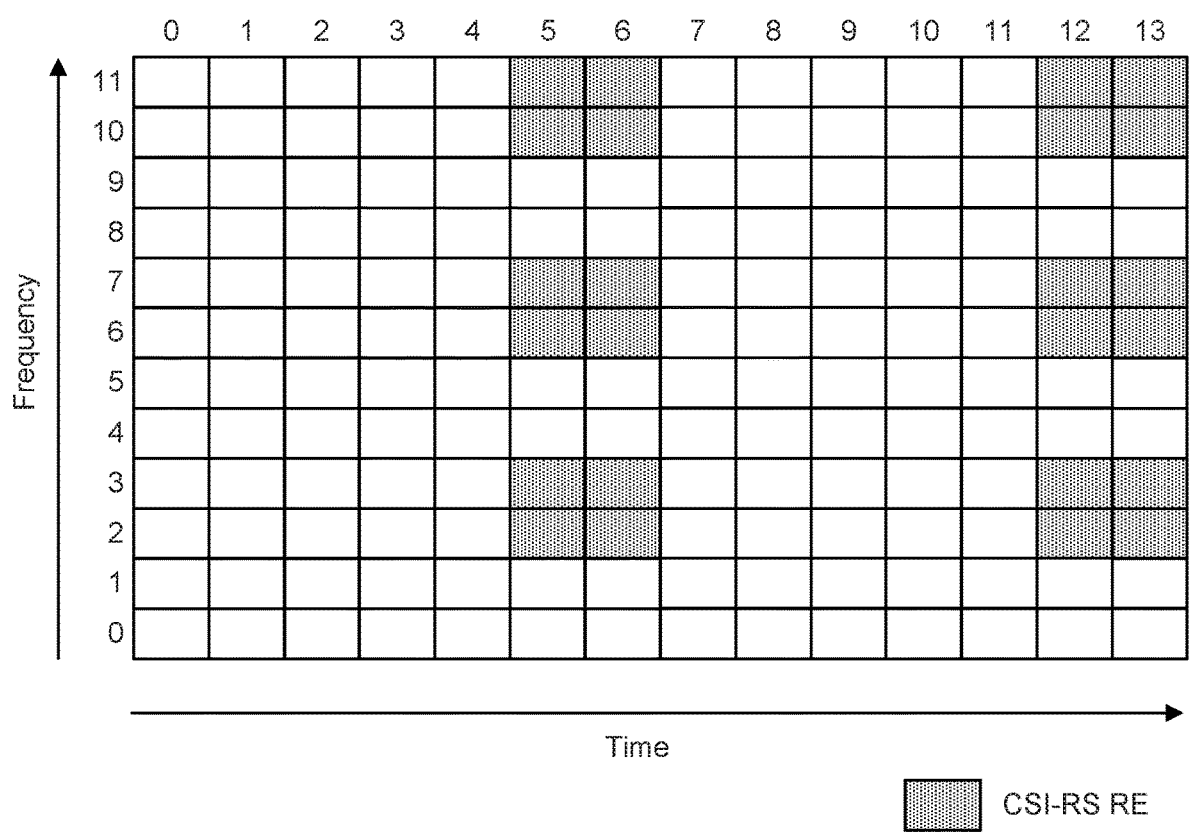
FIG. 4 illustrates a slot resource map in accordance with an example.

FIG. 4 illustrates an example of a slot resource map. In this example, the slot resource map can be of an X=24 port CSI-RS resource that occupies N=4 symbols (i.e., 4 OFDM symbols), say 5, 6, 12, 13 symbols in a slot, constructed using an aggregation of six (Y, Z)=(2, 2) component CSI-RS RE patterns with uniform RE mapping. As shown, six (Y, Z)=(2, 2) component CSI-RS RE patterns can be aggregated in symbols 5, 6, 12 and 13 in the slot.

In one example, a resource map for this resource (as indicated in the slot resource map) can be signaled using a Kronecker product 6×14 bits of a 6-bit and a 14-bit frequency and time map. As a result, signaling overhead for the CSI-RS resource map can be equal to 12/Y+14 bits in total.

FIG. 5 illustrates an example of a frequency and time map. The frequency and time map can be a resource map that indicates a CSI-RS resource. The frequency and time map can be a 6×14 bitmap, in which a '1' can correspond to a start of a (Y, Z) component CSI-RS RE pattern, while remaining values in the bitmap can equal '0'.

In one configuration, with respect to the CSI-RS CDM type parameter, both time-domain and frequency-domain code division multiplexing (CDM) can be supported using orthogonal cover code (OCC). The CDM can be for lengths of {1, 2, 4, 8}. A length 2 OCC CDM-2 can only be applicable in the frequency domain, while a length 4 CDM-4 code can consist of two dimensions in the frequency domain and two dimensions in the time domain, i.e., TD-2 and FD-2. A length 8 CDM code can be supported using FD-2 and TD-4. Given these combinations, the CDMtype for a given CSI-RS resource can be signaled using 4 bits, such that two bits can represent a frequency domain CDM value from a set {1, 2, 4, 8} and likewise the other two bits can represent a time-domain CDM value from a set {1, 2, 4, 8}.

In one configuration, with respect to the CSI-RS frequency band parameter, a CSI-RS configuration of wideband is supported as well as a partial band CSI-RS. Two techniques can be used for signaling a choice of the configured CSI-RS band via an RRC parameter. In NR, there can be a maximum of 275 PRBs across multiple numerologies. A first technique can involve using up to 275 bits (depending on actual system bandwidth) to signal which PRB contains the CSI-RS transmission. The first technique supports wideband as well as both contiguous and noncontiguous partial band CSI-RS. The second technique further optimizes signaling overhead, when there is minimum granularity or step-size, e.g., sub-band, by indicating which sub-bands are configured for the CSI-RS transmission.

In one configuration, a technique for supporting transmission of CSI-RS at a gNB and CSI measurement at a UE is described. The technique can involve configuring one or more CSI-RS resources of different types, such as aperiodic, periodic or semi-persistent, and signaling the configurations to the UE using a higher layer, such as RRC.

In one example, the CSI-RS can be processed according to received CSI-RS configuration parameters from the gNB at the UE. In another example, the CSI-RS can be either non-zero power or zero power. In yet another example, the CSI-RS configurations can include a CSI-RS-ResourceMapping parameter, which can provide an indication of an actual resource element map of a RE per PRB designated for that CSI-RS resource.

In one example, a resource map indication can be provided using independent bitmaps for a frequency domain resource and a time-domain resource. In another example, a number of bits used for indicating a frequency domain resource map can be 12/Y, where the CSI-RS resource can be constituted of one or more components with (Y, Z), Y adjacent RE in the frequency domain and Z adjacent RE in the time domain. A bit set to "1" can indicate a starting of the component (Y, Z). In yet another example, a number of bits used for indicating time-domain occupancy of CSI-RS resource can be 14 bits per slot. A bit set of "1" can indicate symbol indices within a slot in which the CSI-RS resource is configured. In a further example, a joint frequency and time domain resource map can be derived using a Kronecker product of individual frequency and time domain bitmaps.

In one example, CSI-RS ports in a CSI-RS resource can be multiplexed using code division multiplexing (CDM). In another example, the CDM can be either only across the frequency domain, or both time and frequency domains. In yet another example, a length of used CDMs can be a value from the set {1, 2, 4, 8}. In a further example, a CMD type can be configured using a 4 bit field, in which two bits can be used to indicate a frequency domain CDM value and the other two bits can be used to indicate a time-domain CDM value.

In one example, CSI-RS configured for a wideband or partial band can be supported. In another example, the partial band can be indicated by a bitmap having a size of up to 275 bits, where bits set to "1" can indicate PRBs where the CSI-RS resource exists. In yet another example, the partial band can be indicated by a bitmap of a size up to 275/sub-band size, where bits set to "1" can indicate a sub-band of PRBs where the CSI-RS resource exists.

Figure 6:
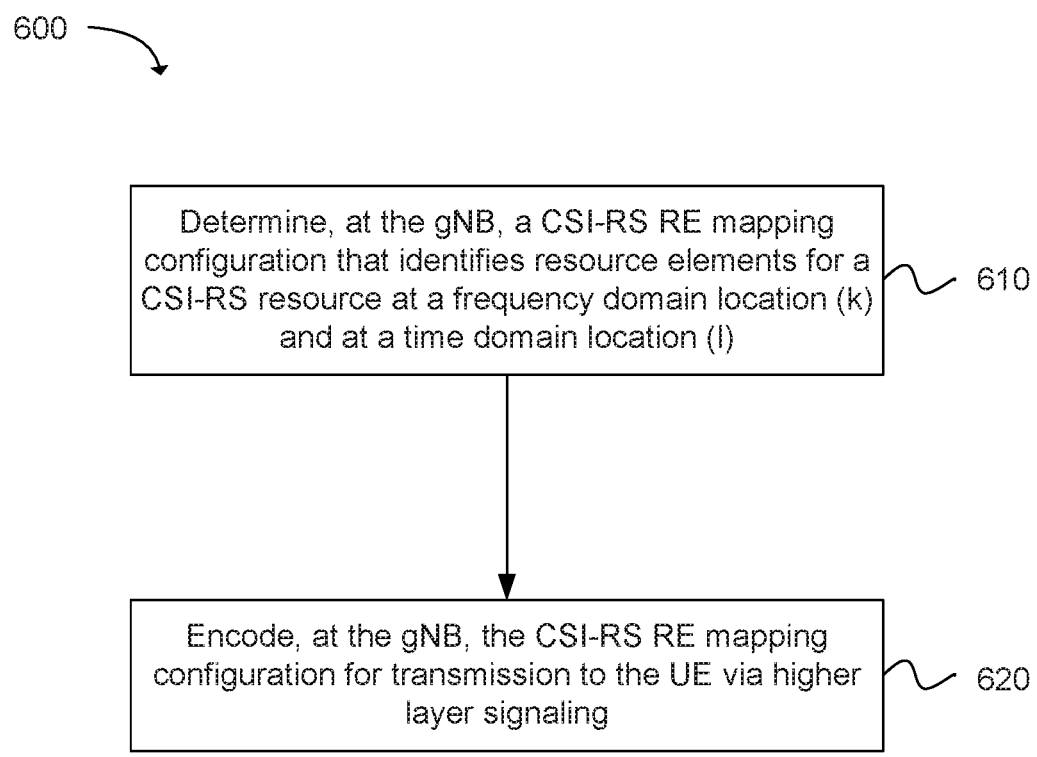
FIG. 6 depicts functionality of a Next Generation NodeB (gNB) operable to communicate a channel state information reference signal (CSI-RS) resource element (RE) mapping configuration to a user equipment (UE) in accordance with an example.

Another example provides functionality 600 of a Next Generation NodeB (gNB) operable to communicate a channel state information reference signal (CSI-RS) resource element (RE) mapping configuration to a user equipment (UE), as shown in FIG. 6. The gNB can comprise one or more processors configured to determine, at the gNB, a CSI-RS RE mapping configuration that identifies resource elements for a CSI-RS resource at a frequency domain location (k) and at a time domain location (l), as in block 610. The gNB can comprise one or more processors configured to encode, at the gNB, the CSI-RS RE mapping configuration for transmission to the UE via higher layer signaling, as in block 620. In addition, the gNB can comprise a memory interface configured to retrieve from a memory the CSI-RS RE mapping configuration.

Figure 7:
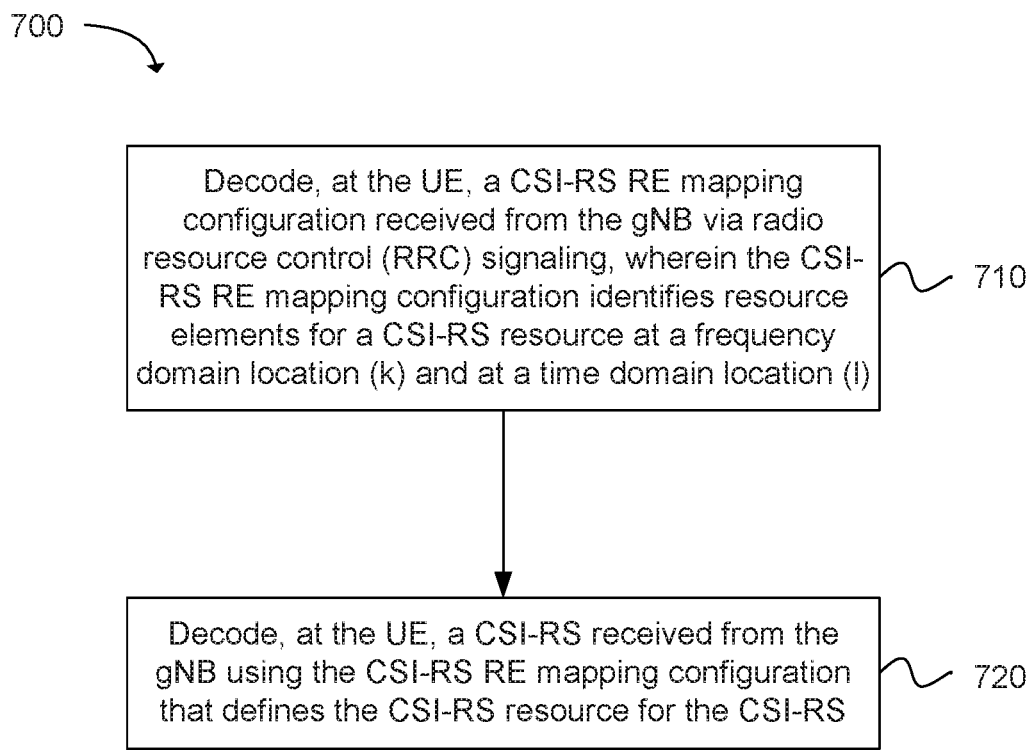
FIG. 7 depicts functionality of a user equipment (UE) operable to decode a channel state information reference signal (CSI-RS) resource element (RE) mapping configuration received from a Next Generation NodeB (gNB) in accordance with an example.

Another example provides functionality 700 of a user equipment (UE) operable to decode a channel state information reference signal (CSI-RS) resource element (RE) mapping configuration received from a Next Generation NodeB (gNB), as shown in FIG. 7. The UE can comprise one or more processors configured to decode, at the UE, a CSI-RS RE mapping configuration received from the gNB via radio resource control (RRC) signaling, wherein the CSI-RS RE mapping configuration identifies resource elements for a CSI-RS resource at a frequency domain location (k) and at a time domain location (l), as in block 710. The UE can comprise one or more processors configured to decode, at the UE, a CSI-RS received from the gNB using the CSI-RS RE mapping configuration that defines the CSI-RS resource for the CSI-RS, as in block 720. In addition, the UE can comprise a memory interface configured to send to a memory the CSI-RS RE mapping configuration.

Figure 8:
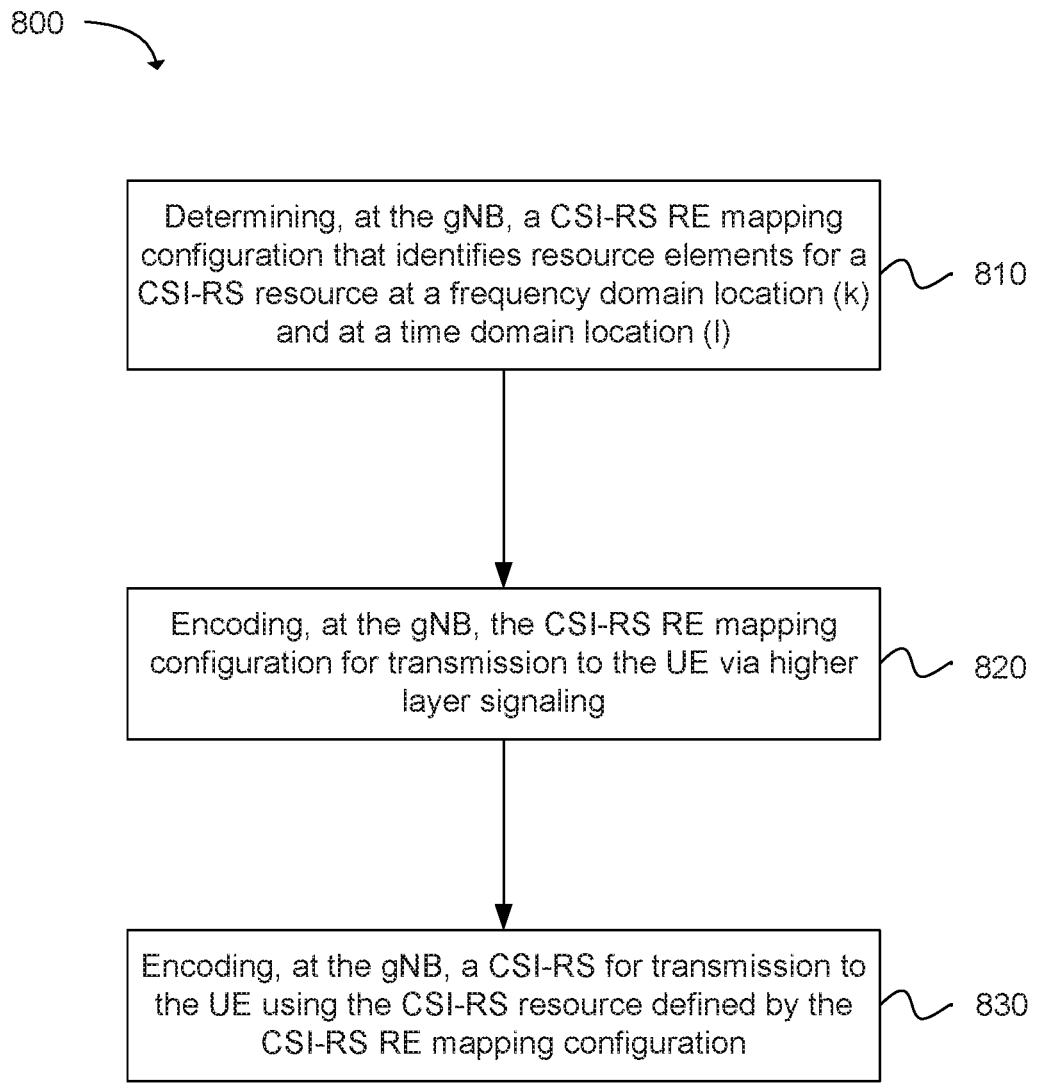
FIG. 8 depicts a flowchart of a machine readable storage medium having instructions embodied thereon for communicating a channel state information reference signal (CSI-RS) resource element (RE) mapping configuration from a Next Generation NodeB (gNB) to a user equipment (UE) in accordance with an example.

Another example provides at least one machine readable storage medium having instructions 800 embodied thereon for communicating a channel state information reference signal (CSI-RS) resource element (RE) mapping configuration from a Next Generation NodeB (gNB) to a user equipment (UE), as shown in FIG. 8. The instructions can be executed on a machine, where the instructions are included on at least one computer readable medium or one non-transitory machine readable storage medium. The instructions when executed by one or more processors of a gNB perform: determining, at the gNB, a CSI-RS RE mapping configuration that identifies resource elements for a CSI-RS resource at a frequency domain location (k) and at a time domain location (l), as in block 810. The instructions when executed by one or more processors of a gNB perform: encoding, at the gNB, the CSI-RS RE mapping configuration for transmission to the UE via higher layer signaling, as in block 820. The instructions when executed by one or more processors of a gNB perform: encoding, at the gNB, a CSI-RS for transmission to the UE using the CSI-RS resource defined by the CSI-RS RE mapping configuration, as in block 830.

Figure 9:
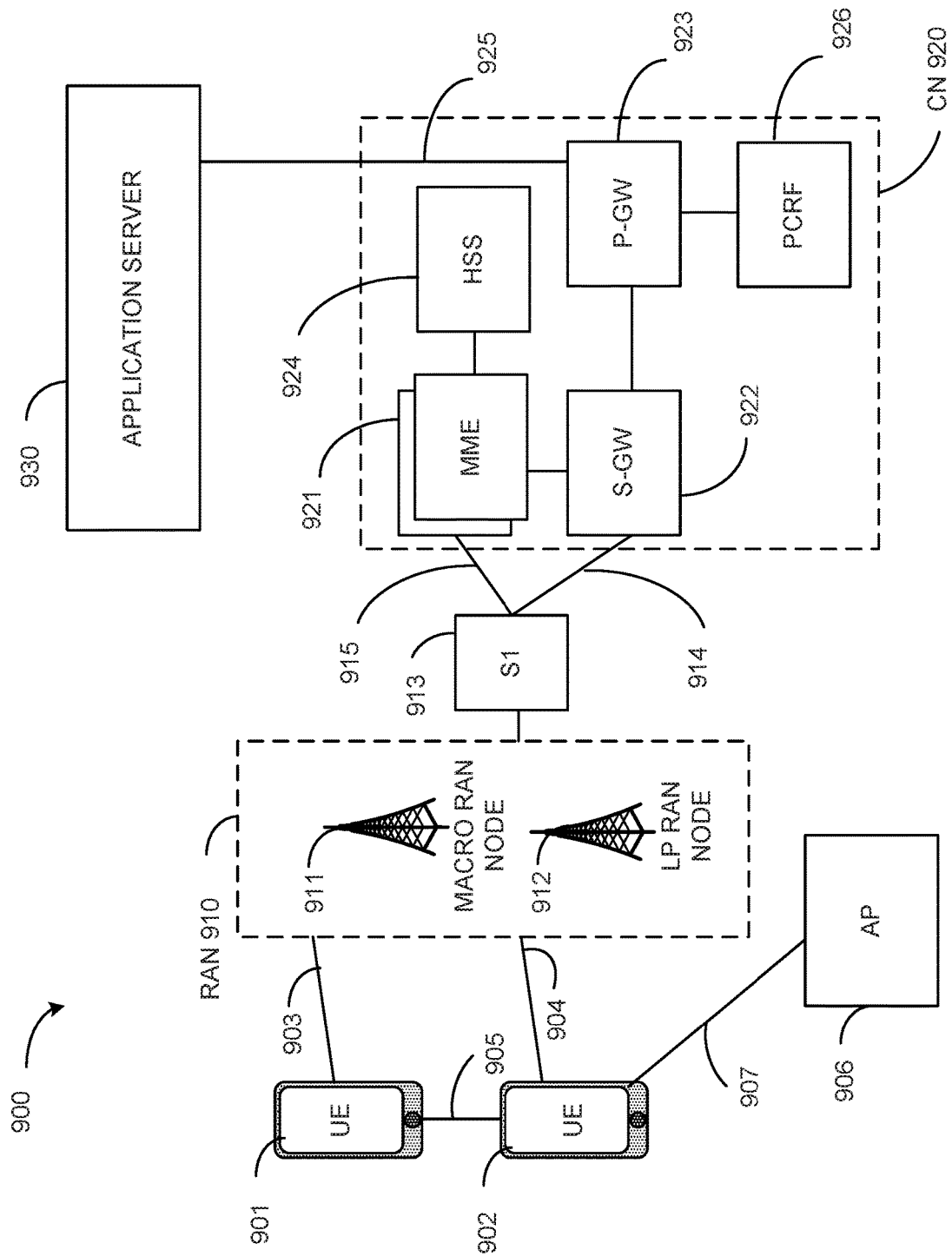
FIG. 9 illustrates an architecture of a wireless network in accordance with an example.

FIG. 9 illustrates an architecture of a system 900 of a network in accordance with some embodiments. The system 900 is shown to include a user equipment (UE) 901 and a UE 902. The UEs 901 and 902 are illustrated as smartphones (e.g., handheld touchscreen mobile computing devices connectable to one or more cellular networks), but may also comprise any mobile or non-mobile computing device, such as Personal Data Assistants (PDAs), pagers, laptop computers, desktop computers, wireless handsets, or any computing device including a wireless communications interface.

In some embodiments, any of the UEs 901 and 902 can comprise an Internet of Things (IoT) UE, which can comprise a network access layer designed for low-power IoT applications utilizing short-lived UE connections. An IoT UE can utilize technologies such as machine-to-machine (M2M) or machine-type communications (MTC) for exchanging data with an MTC server or device via a public land mobile network (PLMN), Proximity-Based Service (ProSe) or device-to-device (D2D) communication, sensor networks, or IoT networks. The M2M or MTC exchange of data may be a machine-initiated exchange of data. An IoT network describes interconnecting IoT UEs, which may include uniquely identifiable embedded computing devices (within the Internet infrastructure), with short-lived connections. The IoT UEs may execute background applications (e.g., keep-alive messages, status updates, etc.) to facilitate the connections of the IoT network.

The UEs 901 and 902 may be configured to connect, e.g., communicatively couple, with a radio access network (RAN) 910—the RAN 910 may be, for example, an Evolved Universal Mobile Telecommunications System (UMTS) Terrestrial Radio Access Network (E-UTRAN), a NextGen RAN (NG RAN), or some other type of RAN. The UEs 901 and 902 utilize connections 903 and 904, respectively, each of which comprises a physical communications interface or layer (discussed in further detail below); in this example, the connections 903 and 904 are illustrated as an air interface to enable communicative coupling, and can be consistent with cellular communications protocols, such as a Global System for Mobile Communications (GSM) protocol, a code-division multiple access (CDMA) network protocol, a Push-to-Talk (PTT) protocol, a PTT over Cellular (POC) protocol, a Universal Mobile Telecommunications System (UMTS) protocol, a 3GPP Long Term Evolution (LTE) protocol, a fifth generation (5G) protocol, a New Radio (NR) protocol, and the like.

In this embodiment, the UEs 901 and 902 may further directly exchange communication data via a ProSe interface 905. The ProSe interface 905 may alternatively be referred to as a sidelink interface comprising one or more logical channels, including but not limited to a Physical Sidelink Control Channel (PSCCH), a Physical Sidelink Shared Channel (PSSCH), a Physical Sidelink Discovery Channel (PSDCH), and a Physical Sidelink Broadcast Channel (PSBCH).

The UE 902 is shown to be configured to access an access point (AP) 906 via connection 907. The connection 907 can comprise a local wireless connection, such as a connection consistent with any IEEE 802.11 protocol, wherein the AP 906 would comprise a wireless fidelity (WiFi®) router. In this example, the AP 906 is shown to be connected to the Internet without connecting to the core network of the wireless system (described in further detail below).

The RAN 910 can include one or more access nodes that enable the connections 903 and 904. These access nodes (ANs) can be referred to as base stations (BSs), NodeBs, evolved NodeBs (eNBs), next Generation NodeBs (gNB), RAN nodes, and so forth, and can comprise ground stations (e.g., terrestrial access points) or satellite stations providing coverage within a geographic area (e.g., a cell). The RAN 910 may include one or more RAN nodes for providing macrocells, e.g., macro RAN node 911, and one or more RAN nodes for providing femtocells or picocells (e.g., cells having smaller coverage areas, smaller user capacity, or higher bandwidth compared to macrocells), e.g., low power (LP) RAN node 912.

Any of the RAN nodes 911 and 912 can terminate the air interface protocol and can be the first point of contact for the UEs 901 and 902. In some embodiments, any of the RAN nodes 911 and 912 can fulfill various logical functions for the RAN 910 including, but not limited to, radio network controller (RNC) functions such as radio bearer management, uplink and downlink dynamic radio resource management and data packet scheduling, and mobility management.

In accordance with some embodiments, the UEs 901 and 902 can be configured to communicate using Orthogonal Frequency-Division Multiplexing (OFDM) communication signals with each other or with any of the RAN nodes 911 and 912 over a multicarrier communication channel in accordance various communication techniques, such as, but not limited to, an Orthogonal Frequency-Division Multiple Access (OFDMA) communication technique (e.g., for downlink communications) or a Single Carrier Frequency Division Multiple Access (SC-FDMA) communication technique (e.g., for uplink and ProSe or sidelink communications), although the scope of the embodiments is not limited in this respect. The OFDM signals can comprise a plurality of orthogonal subcarriers.

In some embodiments, a downlink resource grid can be used for downlink transmissions from any of the RAN nodes 911 and 912 to the UEs 901 and 902, while uplink transmissions can utilize similar techniques. The grid can be a time-frequency grid, called a resource grid or time-frequency resource grid, which is the physical resource in the downlink in each slot. Such a time-frequency plane representation is a common practice for OFDM systems, which makes it intuitive for radio resource allocation. Each column and each row of the resource grid corresponds to one OFDM symbol and one OFDM subcarrier, respectively. The duration of the resource grid in the time domain corresponds to one slot in a radio frame. The smallest time-frequency unit in a resource grid is denoted as a resource element. Each resource grid comprises a number of resource blocks, which describe the mapping of certain physical channels to resource elements. Each resource block comprises a collection of resource elements; in the frequency domain, this may represent the smallest quantity of resources that currently can be allocated. There are several different physical downlink channels that are conveyed using such resource blocks.

The physical downlink shared channel (PDSCH) may carry user data and higher-layer signaling to the UEs 901 and 902. The physical downlink control channel (PDCCH) may carry information about the transport format and resource allocations related to the PDSCH channel, among other things. It may also inform the UEs 901 and 902 about the transport format, resource allocation, and H-ARQ (Hybrid Automatic Repeat Request) information related to the uplink shared channel. Typically, downlink scheduling (assigning control and shared channel resource blocks to the UE 901 within a cell) may be performed at any of the RAN nodes 911 and 912 based on channel quality information fed back from any of the UEs 901 and 902. The downlink resource assignment information may be sent on the PDCCH used for (e.g., assigned to) each of the UEs 901 and 902.

The PDCCH may use control channel elements (CCEs) to convey the control information. Before being mapped to resource elements, the PDCCH complex-valued symbols may first be organized into quadruplets, which may then be permuted using a sub-block interleaver for rate matching. Each PDCCH may be transmitted using one or more of these CCEs, where each CCE may correspond to nine sets of four physical resource elements known as resource element groups (REGs). Four Quadrature Phase Shift Keying (QPSK) symbols may be mapped to each REG. The PDCCH can be transmitted using one or more CCEs, depending on the size of the downlink control information (DCI) and the channel condition. There can be four or more different PDCCH formats defined in LTE with different numbers of CCEs (e.g., aggregation level, L=1, 2, 4, or 8).

Some embodiments may use concepts for resource allocation for control channel information that are an extension of the above-described concepts. For example, some embodiments may utilize an enhanced physical downlink control channel (EPDCCH) that uses PDSCH resources for control information transmission. The EPDCCH may be transmitted using one or more enhanced the control channel elements (ECCEs). Similar to above, each ECCE may correspond to nine sets of four physical resource elements known as an enhanced resource element groups (EREGs). An ECCE may have other numbers of EREGs in some situations.

The RAN 910 is shown to be communicatively coupled to a core network (CN) 920—via an S1 interface 913. In embodiments, the CN 920 may be an evolved packet core (EPC) network, a NextGen Packet Core (NPC) network, or some other type of CN.

In this embodiment the S1 interface 913 is split into two parts: the S1-U interface 914, which carries traffic data between the RAN nodes 911 and 912 and the serving gateway (S-GW) 922, and the S1-mobility management entity (MME) interface 915, which is a signaling interface between the RAN nodes 911 and 912 and MMEs 921.

In this embodiment, the CN 920 comprises the MMEs 921, the S-GW 922, the Packet Data Network (PDN) Gateway (P-GW) 923, and a home subscriber server (HSS) 924. The MMEs 921 may be similar in function to the control plane of legacy Serving General Packet Radio Service (GPRS) Support Nodes (SGSN). The MMEs 921 may manage mobility aspects in access such as gateway selection and tracking area list management. The HSS 924 may comprise a database for network users, including subscription-related information to support the network entities' handling of 829303132333435363738394041e CN 920 may comprise one or several HSSs 924, depending on the number of mobile subscribers, on the capacity of the equipment, on the organization of the network, etc. For example, the HSS 924 can provide support for routing/roaming, authentication, authorization, naming/addressing resolution, location dependencies, etc.

The S-GW 922 may terminate the S1 interface 913 towards the RAN 910, and routes data packets between the RAN 910 and the CN 920. In addition, the S-GW 922 may be a local mobility anchor point for inter-RAN node handovers and also may provide an anchor for inter-3GPP mobility. Other responsibilities may include lawful intercept, charging, and some policy enforcement.

The P-GW 923 may terminate an SGi interface toward a PDN. The P-GW 923 may route data packets between the EPC network 923 and external networks such as a network including the application server 930 (alternatively referred to as application function (AF)) via an Internet Protocol (IP) interface 925. Generally, the application server 930 may be an element offering applications that use IP bearer resources with the core network (e.g., UMTS Packet Services (PS) domain, LTE PS data services, etc.). In this embodiment, the P-GW 923 is shown to be communicatively coupled to an application server 930 via an IP communications interface 925. The application server 930 can also be configured to support one or more communication services (e.g., Voice-over-Internet Protocol (VoIP) sessions, PTT sessions, group communication sessions, social networking services, etc.) for the UEs 901 and 902 via the CN 920.

The P-GW 923 may further be a node for policy enforcement and charging data collection. Policy and Charging Enforcement Function (PCRF) 926 is the policy and charging control element of the CN 920. In a non-roaming scenario, there may be a single PCRF in the Home Public Land Mobile Network (HPLMN) associated with a UE's Internet Protocol Connectivity Access Network (IP-CAN) session. In a roaming scenario with local breakout of traffic, there may be two PCRFs associated with a UE's IP-CAN session: a Home PCRF (H-PCRF) within a HPLMN and a Visited PCRF (V-PCRF) within a Visited Public Land Mobile Network (VPLMN). The PCRF 926 may be communicatively coupled to the application server 930 via the P-GW 923. The application server 930 may signal the PCRF 926 to indicate a new service flow and select the appropriate Quality of Service (QoS) and charging parameters. The PCRF 926 may provision this rule into a Policy and Charging Enforcement Function (PCEF) (not shown) with the appropriate traffic flow template (TFT) and QoS class of identifier (QCI), which commences the QoS and charging as specified by the application server 930.

Figure 10:
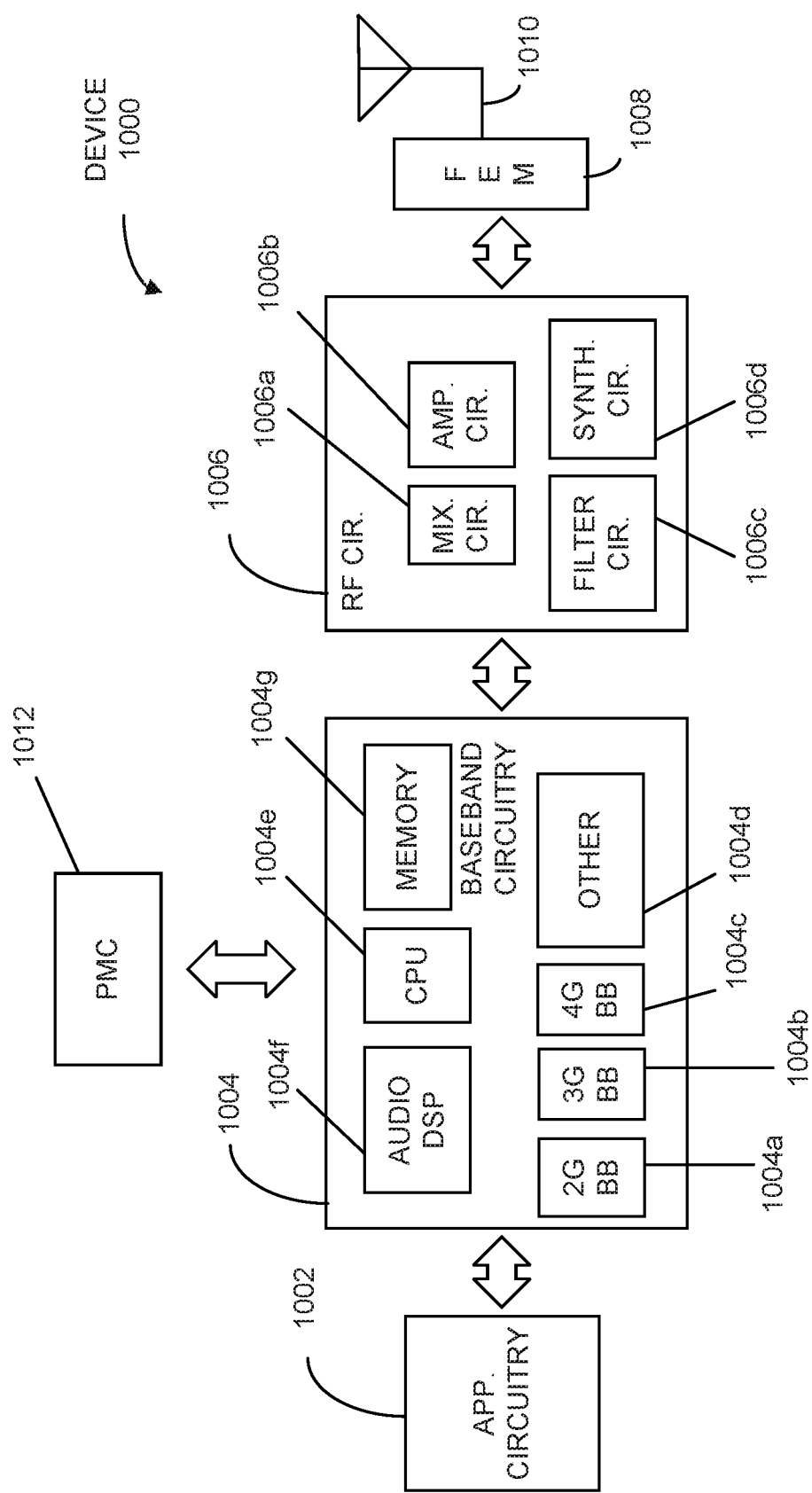
FIG. 10 illustrates a diagram of a wireless device (e.g., UE) in accordance with an example.

FIG. 10 illustrates example components of a device 1000 in accordance with some embodiments. In some embodiments, the device 1000 may include application circuitry 1002, baseband circuitry 1004, Radio Frequency (RF) circuitry 1006, front-end module (FEM) circuitry 1008, one or more antennas 1010, and power management circuitry (PMC) 1012 coupled together at least as shown. The components of the illustrated device 1000 may be included in a UE or a RAN node. In some embodiments, the device 1000 may include less elements (e.g., a RAN node may not utilize application circuitry 1002, and instead include a processor/controller to process IP data received from an EPC). In some embodiments, the device 1000 may include additional elements such as, for example, memory/storage, display, camera, sensor, or input/output (I/O) interface. In other embodiments, the components described below may be included in more than one device (e.g., said circuitries may be separately included in more than one device for Cloud-RAN (C-RAN) implementations).

The application circuitry 1002 may include one or more application processors. For example, the application circuitry 1002 may include circuitry such as, but not limited to, one or more single-core or multi-core processors. The processor(s) may include any combination of general-purpose processors and dedicated processors (e.g., graphics processors, application processors, etc.). The processors may be coupled with or may include memory/storage and may be configured to execute instructions stored in the memory/storage to enable various applications or operating systems to run on the device 1000. In some embodiments, processors of application circuitry 1002 may process IP data packets received from an EPC.

The baseband circuitry 1004 may include circuitry such as, but not limited to, one or more single-core or multi-core processors. The baseband circuitry 1004 may include one or more baseband processors or control logic to process baseband signals received from a receive signal path of the RF circuitry 1006 and to generate baseband signals for a transmit signal path of the RF circuitry 1006. Baseband processing circuitry 1004 may interface with the application circuitry 1002 for generation and processing of the baseband signals and for controlling operations of the RF circuitry 1006. For example, in some embodiments, the baseband circuitry 1004 may include a third generation (3G) baseband processor 1004a, a fourth generation (4G) baseband processor 1004b, a fifth generation (5G) baseband processor 1004c, or other baseband processor(s) 1004d for other existing generations, generations in development or to be developed in the future (e.g., second generation (2G), sixth generation (6G), etc.). The baseband circuitry 1004 (e.g., one or more of baseband processors 1004a-d) may handle various radio control functions that enable communication with one or more radio networks via the RF circuitry 1006. In other embodiments, some or all of the functionality of baseband processors 1004a-d may be included in modules stored in the memory 1004g and executed via a Central Processing Unit (CPU) 1004e. The radio control functions may include, but are not limited to, signal modulation/demodulation, encoding/decoding, radio frequency shifting, etc. In some embodiments, modulation/demodulation circuitry of the baseband circuitry 1004 may include Fast-Fourier Transform (FFT), precoding, or constellation mapping/demapping functionality. In some embodiments, encoding/decoding circuitry of the baseband circuitry 1004 may include convolution, tail-biting convolution, turbo, Viterbi, or Low Density Parity Check (LDPC) encoder/decoder functionality. Embodiments of modulation/demodulation and encoder/decoder functionality are not limited to these examples and may include other suitable functionality in other embodiments.

In some embodiments, the baseband circuitry 1004 may include one or more audio digital signal processor(s) (DSP) 1004*f*. The audio DSP(s) 1004*f* may be include elements for compression/decompression and echo cancellation and may include other suitable processing elements in other embodiments. Components of the baseband circuitry may be suitably combined in a single chip, a single chipset, or disposed on a same circuit board in some embodiments. In some embodiments, some or all of the constituent components of the baseband circuitry 1004 and the application circuitry 1002 may be implemented together such as, for example, on a system on a chip (SOC).

In some embodiments, the baseband circuitry 1004 may provide for communication compatible with one or more radio technologies. For example, in some embodiments, the baseband circuitry 1004 may support communication with an evolved universal terrestrial radio access network (EUTRAN) or other wireless metropolitan area networks (WMAN), a wireless local area network (WLAN), a wireless personal area network (WPAN). Embodiments in which the baseband circuitry 1004 is configured to support radio communications of more than one wireless protocol may be referred to as multi-mode baseband circuitry.

RF circuitry 1006 may enable communication with wireless networks using modulated electromagnetic radiation through a non-solid medium. In various embodiments, the RF circuitry 1006 may include switches, filters, amplifiers, etc. to facilitate the communication with the wireless network. RF circuitry 1006 may include a receive signal path which may include circuitry to down-convert RF signals received from the FEM circuitry 1008 and provide baseband signals to the baseband circuitry 1004. RF circuitry 1006 may also include a transmit signal path which may include circuitry to up-convert baseband signals provided by the baseband circuitry 1004 and provide RF output signals to the FEM circuitry 1008 for transmission.

In some embodiments, the receive signal path of the RF circuitry 1006 may include mixer circuitry 1006*a*, amplifier circuitry 1006*b* and filter circuitry 1006*c*. In some embodiments, the transmit signal path of the RF circuitry 1006 may include filter circuitry 1006*c* and mixer circuitry 1006*a*. RF circuitry 1006 may also include synthesizer circuitry 1006*d* for synthesizing a frequency for use by the mixer circuitry 1006*a* of the receive signal path and the transmit signal path. In some embodiments, the mixer circuitry 1006*a* of the receive signal path may be configured to down-convert RF signals received from the FEM circuitry 1008 based on the synthesized frequency provided by synthesizer circuitry 1006*d*. The amplifier circuitry 1006*b* may be configured to amplify the down-converted signals and the filter circuitry 1006*c* may be a low-pass filter (LPF) or band-pass filter (BPF) configured to remove unwanted signals from the down-converted signals to generate output baseband signals. Output baseband signals may be provided to the baseband circuitry 1004 for further processing. In some embodiments, the output baseband signals may be zero-frequency baseband signals, although this is not a necessity. In some embodiments, mixer circuitry 1006*a* of the receive signal path may comprise passive mixers, although the scope of the embodiments is not limited in this respect.

In some embodiments, the mixer circuitry 1006*a* of the transmit signal path may be configured to up-convert input baseband signals based on the synthesized frequency provided by the synthesizer circuitry 1006*d* to generate RF output signals for the FEM circuitry 1008. The baseband signals may be provided by the baseband circuitry 1004 and may be filtered by filter circuitry 1006*c*.

In some embodiments, the mixer circuitry 1006*a* of the receive signal path and the mixer circuitry 1006*a* of the transmit signal path may include two or more mixers and may be arranged for quadrature downconversion and upconversion, respectively. In some embodiments, the mixer circuitry 1006*a* of the receive signal path and the mixer circuitry 1006*a* of the transmit signal path may include two or more mixers and may be arranged for image rejection (e.g., Hartley image rejection). In some embodiments, the mixer circuitry 1006*a* of the receive signal path and the mixer circuitry 1006*a* may be arranged for direct downconversion and direct upconversion, respectively. In some embodiments, the mixer circuitry 1006*a* of the receive signal path and the mixer circuitry 1006*a* of the transmit signal path may be configured for super-heterodyne operation.

In some embodiments, the output baseband signals and the input baseband signals may be analog baseband signals, although the scope of the embodiments is not limited in this respect. In some alternate embodiments, the output baseband signals and the input baseband signals may be digital baseband signals. In these alternate embodiments, the RF circuitry 1006 may include analog-to-digital converter (ADC) and digital-to-analog converter (DAC) circuitry and the baseband circuitry 1004 may include a digital baseband interface to communicate with the RF circuitry 1006.

In some dual-mode embodiments, a separate radio IC circuitry may be provided for processing signals for each spectrum, although the scope of the embodiments is not limited in this respect.

In some embodiments, the synthesizer circuitry 1006*d* may be a fractional-N synthesizer or a fractional N/N+1 synthesizer, although the scope of the embodiments is not limited in this respect as other types of frequency synthesizers may be suitable. For example, synthesizer circuitry 1006*d* may be a delta-sigma synthesizer, a frequency multiplier, or a synthesizer comprising a phase-locked loop with a frequency divider.

The synthesizer circuitry 1006*d* may be configured to synthesize an output frequency for use by the mixer circuitry 1006*a* of the RF circuitry 1006 based on a frequency input and a divider control input. In some embodiments, the synthesizer circuitry 1006*d* may be a fractional N/N+1 synthesizer.

In some embodiments, frequency input may be provided by a voltage controlled oscillator (VCO), although that is not a necessity. Divider control input may be provided by either the baseband circuitry 1004 or the applications processor 1002 depending on the desired output frequency. In some embodiments, a divider control input (e.g., N) may be determined from a look-up table based on a channel indicated by the applications processor 1002.

Synthesizer circuitry 1006*d* of the RF circuitry 1006 may include a divider, a delay-locked loop (DLL), a multiplexer and a phase accumulator. In some embodiments, the divider may be a dual modulus divider (DMD) and the phase accumulator may be a digital phase accumulator (DPA). In some embodiments, the DMD may be configured to divide the input signal by either N or N+1 (e.g., based on a carry out) to provide a fractional division ratio. In some example embodiments, the DLL may include a set of cascaded, tunable, delay elements, a phase detector, a charge pump and a D-type flip-flop. In these embodiments, the delay elements may be configured to break a VCO period up into Nd equal packets of phase, where Nd is the number of delay elements in the delay line. In this way, the DLL provides negative feedback to help ensure that the total delay through the delay line is one VCO cycle.

In some embodiments, synthesizer circuitry 1006d may be configured to generate a carrier frequency as the output frequency, while in other embodiments, the output frequency may be a multiple of the carrier frequency (e.g., twice the carrier frequency, four times the carrier frequency) and used in conjunction with quadrature generator and divider circuitry to generate multiple signals at the carrier frequency with multiple different phases with respect to each other. In some embodiments, the output frequency may be a LO frequency (fLO). In some embodiments, the RF circuitry 1006 may include an IQ/polar converter.

FEM circuitry 1008 may include a receive signal path which may include circuitry configured to operate on RF signals received from one or more antennas 1010, amplify the received signals and provide the amplified versions of the received signals to the RF circuitry 1006 for further processing. FEM circuitry 1008 may also include a transmit signal path which may include circuitry configured to amplify signals for transmission provided by the RF circuitry 1006 for transmission by one or more of the one or more antennas 1010. In various embodiments, the amplification through the transmit or receive signal paths may be done solely in the RF circuitry 1006, solely in the FEM 1008, or in both the RF circuitry 1006 and the FEM 1008.

In some embodiments, the FEM circuitry 1008 may include a TX/RX switch to switch between transmit mode and receive mode operation. The FEM circuitry may include a receive signal path and a transmit signal path. The receive signal path of the FEM circuitry may include an LNA to amplify received RF signals and provide the amplified received RF signals as an output (e.g., to the RF circuitry 1006). The transmit signal path of the FEM circuitry 1008 may include a power amplifier (PA) to amplify input RF signals (e.g., provided by RF circuitry 1006), and one or more filters to generate RF signals for subsequent transmission (e.g., by one or more of the one or more antennas 1010).

In some embodiments, the PMC 1012 may manage power provided to the baseband circuitry 1004. In particular, the PMC 1012 may control power-source selection, voltage scaling, battery charging, or DC-to-DC conversion. The PMC 1012 may often be included when the device 1000 is capable of being powered by a battery, for example, when the device is included in a UE. The PMC 1012 may increase the power conversion efficiency while providing desirable implementation size and heat dissipation characteristics.

While FIG. 10 shows the PMC 1012 coupled only with the baseband circuitry 1004. However, in other embodiments, the PMC 10 12 may be additionally or alternatively coupled with, and perform similar power management operations for, other components such as, but not limited to, application circuitry 1002, RF circuitry 1006, or FEM 1008.

In some embodiments, the PMC 1012 may control, or otherwise be part of, various power saving mechanisms of the device 1000. For example, if the device 1000 is in an RRC Connected state, where it is still connected to the RAN node as it expects to receive traffic shortly, then it may enter a state known as Discontinuous Reception Mode (DRX) after a period of inactivity. During this state, the device 1000 may power down for brief intervals of time and thus save power.

If there is no data traffic activity for an extended period of time, then the device 1000 may transition off to an RRC Idle state, where it disconnects from the network and does not perform operations such as channel quality feedback, handover, etc. The device 1000 goes into a very low power state and it performs paging where again it periodically wakes up to listen to the network and then powers down again. The device 1000 may not receive data in this state, in order to receive data, it can transition back to RRC Connected state.

An additional power saving mode may allow a device to be unavailable to the network for periods longer than a paging interval (ranging from seconds to a few hours). During this time, the device is totally unreachable to the network and may power down completely. Any data sent during this time incurs a large delay and it is assumed the delay is acceptable.

Processors of the application circuitry 1002 and processors of the baseband circuitry 1004 may be used to execute elements of one or more instances of a protocol stack. For example, processors of the baseband circuitry 1004, alone or in combination, may be used execute Layer 3, Layer 2, or Layer 1 functionality, while processors of the application circuitry 1004 may utilize data (e.g., packet data) received from these layers and further execute Layer 4 functionality (e.g., transmission communication protocol (TCP) and user datagram protocol (UDP) layers). As referred to herein, Layer 3 may comprise a radio resource control (RRC) layer, described in further detail below. As referred to herein, Layer 2 may comprise a medium access control (MAC) layer, a radio link control (RLC) layer, and a packet data convergence protocol (PDCP) layer, described in further detail below. As referred to herein, Layer 1 may comprise a physical (PHY) layer of a UE/RAN node, described in further detail below.

Figure 11:
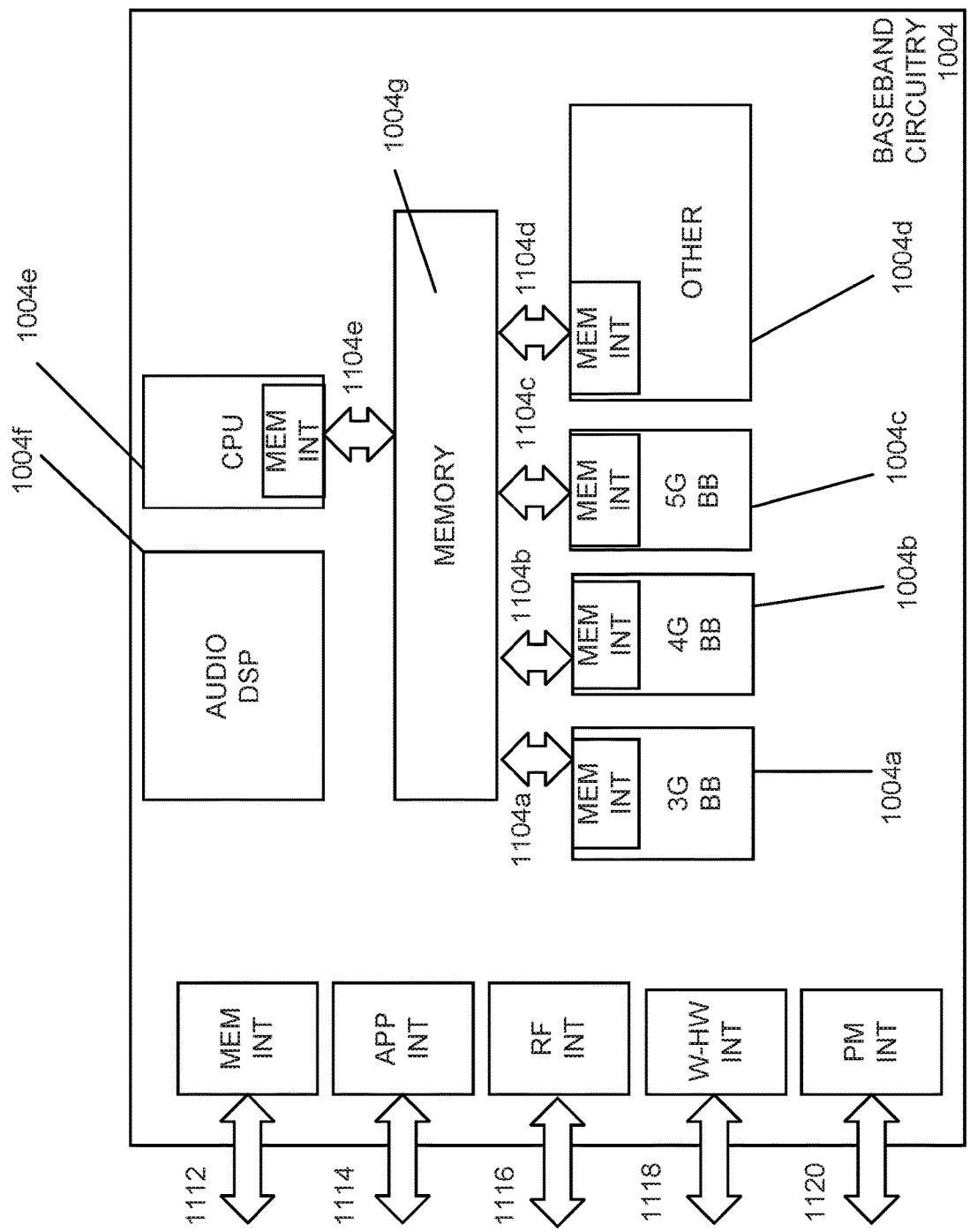
FIG. 11 illustrates interfaces of baseband circuitry in accordance with an example.

FIG. 11 illustrates example interfaces of baseband circuitry in accordance with some embodiments. As discussed above, the baseband circuitry 1004 of FIG. 10 may comprise processors 1004a-1004e and a memory 1004g utilized by said processors. Each of the processors 1004a-1004e may include a memory interface, 1104a-1104e, respectively, to send/receive data to/from the memory 1004g.

The baseband circuitry 1004 may further include one or more interfaces to communicatively couple to other circuitries/devices, such as a memory interface 1112 (e.g., an interface to send/receive data to/from memory external to the baseband circuitry 1004), an application circuitry interface 1114 (e.g., an interface to send/receive data to/from the application circuitry 1002 of FIG. 10), an RF circuitry interface 1116 (e.g., an interface to send/receive data to/from RF circuitry 1006 of FIG. 10), a wireless hardware connectivity interface 1118 (e.g., an interface to send/receive data to/from Near Field Communication (NFC) components, Bluetooth® components (e.g., Bluetooth® Low Energy), Wi-Fi® components, and other communication components), and a power management interface 1120 (e.g., an interface to send/receive power or control signals to/from the PMC 1012.

Figure 12:
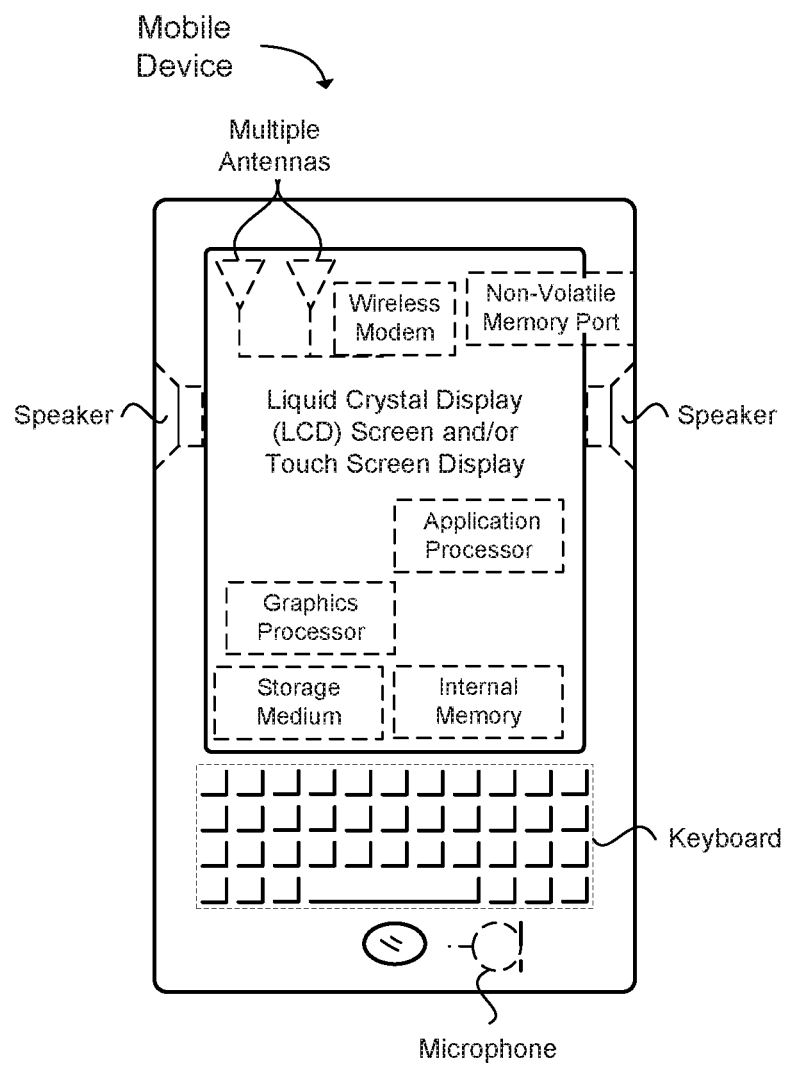
FIG. 12 illustrates a diagram of a wireless device (e.g., UE) in accordance with an example.

FIG. 12 provides an example illustration of the wireless device, such as a user equipment (UE), a mobile station (MS), a mobile wireless device, a mobile communication device, a tablet, a handset, or other type of wireless device. The wireless device can include one or more antennas configured to communicate with a node, macro node, low power node (LPN), or, transmission station, such as a base station (BS), an evolved Node B (eNB), a baseband processing unit (BBU), a remote radio head (RRH), a remote radio equipment (RRE), a relay station (RS), a radio equipment (RE), or other type of wireless wide area network (WWAN) access point. The wireless device can be configured to communicate using at least one wireless communication standard such as, but not limited to, 3GPP LTE, WiMAX, High Speed Packet Access (HSPA), Bluetooth, and WiFi. The wireless device can communicate using separate antennas for each wireless communication standard or shared antennas for multiple wireless communication standards. The wireless device can communicate in a wireless local area network (WLAN), a wireless personal area network (WPAN), and/or a WWAN. The wireless device can also comprise a wireless modem. The wireless modem can comprise, for example, a wireless radio transceiver and baseband circuitry (e.g., a baseband processor). The wireless modem can, in one example, modulate signals that the wireless device transmits via the one or more antennas and demodulate signals that the wireless device receives via the one or more antennas.

FIG. 12 also provides an illustration of a microphone and one or more speakers that can be used for audio input and output from the wireless device. The display screen can be a liquid crystal display (LCD) screen, or other type of display screen such as an organic light emitting diode (OLED) display. The display screen can be configured as a touch screen. The touch screen can use capacitive, resistive, or another type of touch screen technology. An application processor and a graphics processor can be coupled to internal memory to provide processing and display capabilities. A non-volatile memory port can also be used to provide data input/output options to a user. The non-volatile memory port can also be used to expand the memory capabilities of the wireless device. A keyboard can be integrated with the wireless device or wirelessly connected to the wireless device to provide additional user input. A virtual keyboard can also be provided using the touch screen.

EXAMPLES

The following examples pertain to specific technology embodiments and point out specific features, elements, or actions that can be used or otherwise combined in achieving such embodiments.

Example 1 includes an apparatus of a Next Generation NodeB (gNB) operable to communicate a channel state information reference signal (CSI-RS) resource element (RE) mapping configuration to a user equipment (UE), the apparatus comprising: one or more processors configured to: determine, at the gNB, a CSI-RS RE mapping configuration that identifies resource elements for a CSI-RS resource at a frequency domain location (k) and at a time domain location (l); and encode, at the gNB, the CSI-RS RE mapping configuration for transmission to the UE via higher layer signaling; and a memory interface configured to retrieve from a memory the CSI-RS RE mapping configuration.

Example 2 includes the apparatus of Example 1, wherein the one or more processors are further configured to encode a CSI-RS for transmission to the UE using the CSI-RS resource defined by the CSI-RS RE mapping configuration.

Example 3 includes the apparatus of any of Examples 1 to 2, wherein the one or more processors are further configured to: select a location for the CSI-RS resource based on the CSI-RS RE mapping configuration that indicates that the CSI-RS resource occupies identical frequency domain resources in occupied orthogonal frequency division multiplexing (OFDM) symbols.

Example 4 includes the apparatus of any of Examples 1 to 3, wherein the one or more processors are further configured to encode the CSI-RS RE mapping configuration for transmission to the UE, wherein the CSI-RS RE mapping configuration includes a bitmap that indicates the frequency domain location of the CSI-RS resource, wherein the bitmap is provided by a CSI-RS resource mapping (CSI-RS-ResourceMapping) higher-layer parameter in the CSI-RS RE mapping configuration.

Example 5 includes the apparatus of any of Examples 1 to 4, wherein the one or more processors are further configured to form the bitmap using a number of bits that is reduced based on an actual number of symbols used for the transmission of the CSI-RS to the UE.

Example 6 includes the apparatus of any of Examples 1 to 5, wherein the one or more processors are further configured to encode the CSI-RS for transmission to the UE in accordance with a code division multiplexing (CDM) group with a size selected from a set of $\{1, 2, 4, 8\}$.

Example 7 includes the apparatus of any of Examples 1 to 6, wherein the one or more processors are further configured to limit the CDM group to co-located REs in the frequency domain and the time domain.

Example 8 includes the apparatus of any of Examples 1 to 7, wherein the one or more processors are further configured to identify the resource elements for the CSI-RS resource, wherein a CSI-RS code division multiplexing (CDM)-8 (CDM-8) is applied using two frequency domain resource elements (FD2) and four time domain resource elements (TD4) when a number of antenna ports is equal to 32.

Example 9 includes the apparatus of any of Examples 1 to 8, wherein the two frequency domain resource elements (FD2) are adjacent and the four time domain resource elements (TD4) are adjacent.

Example 10 includes the apparatus of any of Examples 1 to 9, wherein the CSI-RS RE mapping configuration is for up to 32 antenna ports.

Example 11 includes the apparatus of any of Examples 1 to 10, wherein the resource elements are within resource blocks occupied by the CSI-RS resource which is configured for the UE.

Example 12 includes the apparatus of any of Examples 1 to 11, wherein the one or more processors are further configured to encode the CSI-RS RE mapping configuration for transmission to the UE, wherein the CSI-RS RE mapping configuration includes an indication of sub-bands which are configured for the transmission of the CSI-RS to the UE.

Example 13 includes the apparatus of any of Examples 1 to 12, wherein the one or more processors are further configured to encode the CSI-RS RE mapping configuration for transmission to the UE, wherein the CSI-RS RE mapping configuration includes a second bitmap that indicates a time-domain location of the CSI-RS resource, wherein the second bitmap is provided by a CSI-RS resource mapping (CSI-RS-ResourceMapping) higher-layer parameter in the CSI-RS RE mapping configuration.

Example 14 includes the apparatus of any of Examples 1 to 13, wherein the one or more processors are further configured to encode an indication of a code division multiplexing (CDM) type for transmission to the UE, wherein the CDM type includes two bits for a frequency domain CDM value from a set of $\{1, 2, 4, 8\}$ and two bits for a time domain CDM value from the set of $\{1, 2, 4, 8\}$.

Example 15 includes an apparatus of a user equipment (UE) operable to decode a channel state information reference signal (CSI-RS) resource element (RE) mapping configuration received from a Next Generation NodeB (gNB), the apparatus comprising: one or more processors configured to: decode, at the UE, a CSI-RS RE mapping configuration received from the gNB via radio resource control (RRC) signaling, wherein the CSI-RS RE mapping configuration identifies resource elements for a CSI-RS resource at a frequency domain location (k) and at a time domain location (l); and decode, at the UE, a CSI-RS received from the gNB using the CSI-RS RE mapping configuration that defines the CSI-RS resource for the CSI-RS; and a memory interface configured to send to a memory the CSI-RS RE mapping configuration.

Example 16 includes the apparatus of Example 15, wherein the one or more processors are further configured to: decode the CSI-RS RE mapping configuration received from the gNB, wherein the CSI-RS RE mapping configuration includes a bitmap that indicates the frequency domain location of the CSI-RS resource, wherein the bitmap is provided by a CSI-RS resource mapping (CSI-RS-ResourceMapping) higher-layer parameter in the CSI-RS RE mapping configuration; or decode the CSI-RS received from the gNB in accordance with a code division multiplexing (CDM) group with a size selected from a set of {1, 2, 4, 8}.

Example 17 includes the apparatus of any of Examples 15 to 16, wherein the CSI-RS resource constitutes of one or more CSI-RS resource components with (k, l), where a starting sub-carrier index of a (k, l) CSI-RS component is an integral multiple of k, wherein aggregated CSI-RS resource components occupy identical frequency domain resources in occupied orthogonal frequency division multiplexing (OFDM) symbols.

Example 18 includes the apparatus of any of Examples 15 to 17, wherein the one or more processors are further configured to decode the CSI-RS RE mapping configuration received from the gNB, wherein the CSI-RS RE mapping configuration includes a second bitmap that indicates a time-domain location of the CSI-RS resource, wherein the second bitmap is provided by a CSI-RS resource mapping (CSI-RS-ResourceMapping) higher-layer parameter in the CSI-RS RE mapping configuration.

Example 19 includes at least one machine readable storage medium having instructions embodied thereon for communicating a channel state information reference signal (CSI-RS) resource element (RE) mapping configuration from a Next Generation NodeB (gNB) to a user equipment (UE), the instructions when executed by one or more processors at the gNB perform the following: determining, at the gNB, a CSI-RS RE mapping configuration that identifies resource elements for a CSI-RS resource at a frequency domain location (k) and at a time domain location (l); encoding, at the gNB, the CSI-RS RE mapping configuration for transmission to the UE via higher layer signaling; and encoding, at the gNB, a CSI-RS for transmission to the UE using the CSI-RS resource defined by the CSI-RS RE mapping configuration.

Example 20 includes the at least one machine readable storage medium of Example 19, further comprising instructions when executed perform the following: selecting a location for the CSI-RS resource based on the CSI-RS RE mapping configuration that indicates that the CSI-RS resource occupies identical frequency domain resources in occupied orthogonal frequency division multiplexing (OFDM) symbols.

Example 21 includes the at least one machine readable storage medium of any of Examples 19 to 20, further comprising instructions when executed perform the following: encoding the CSI-RS RE mapping configuration for transmission to the UE, wherein the CSI-RS RE mapping configuration includes a bitmap that indicates the frequency domain location of the CSI-RS resource, wherein the bitmap is provided by a CSI-RS resource mapping (CSI-RS-ResourceMapping) higher-layer parameter in the CSI-RS RE mapping configuration; and forming the bitmap using a number of bits that is reduced based on an actual number of symbols used for the transmission of the CSI-RS to the UE, wherein the number of bits is 12/Y, wherein the CSI-RS resource constitutes of one or more CSI-RS resource components with (k, l), with k adjacent REs in a frequency domain and k adjacent REs in a time domain, and a bit set to '1' indicates a start of the CSI-RS resource component (k, l).

Example 22 includes the at least one machine readable storage medium of any of Examples 19 to 21, further comprising instructions when executed perform the following: encoding the CSI-RS for transmission to the UE in accordance with a code division multiplexing (CDM) group with a size selected from a set of {1, 2, 4, 8}; and limiting the CDM group to co-located REs in the frequency domain and the time domain.

Example 23 includes the at least one machine readable storage medium of any of Examples 19 to 22, further comprising instructions when executed perform the following: identifying the resource elements for the CSI-RS resource, wherein a CSI-RS code division multiplexing (CDM)-8 (CDM-8) is applied using two frequency domain resource elements (FD2) and four time domain resource elements (TD4) when a number of antenna ports is equal to 32, wherein the two frequency domain resource elements (FD2) are adjacent and the four time domain resource elements (TD4) are adjacent.

Example 24 includes the at least one machine readable storage medium of any of Examples 19 to 23, further comprising instructions when executed perform the following: encoding the CSI-RS RE mapping configuration for transmission to the UE, wherein the CSI-RS RE mapping configuration includes an indication of sub-bands which are configured for the transmission of the CSI-RS to the UE.

Example 25 includes the at least one machine readable storage medium of any of Examples 19 to 24, further comprising instructions when executed perform the following: encoding an indication of a code division multiplexing (CDM) type for transmission to the UE, wherein the CDM type includes two bits for a frequency domain CDM value from a set of {1, 2, 4, 8} and two bits for a time domain CDM value from the set of {1, 2, 4, 8}.

Example 26 includes a Next Generation NodeB (gNB) operable to communicate a channel state information reference signal (CSI-RS) resource element (RE) mapping configuration to a user equipment (UE), the gNB comprising: means for determining, at the gNB, a CSI-RS RE mapping configuration that identifies resource elements for a CSI-RS resource at a frequency domain location (k) and at a time domain location (l); means for encoding, at the gNB, the CSI-RS RE mapping configuration for transmission to the UE via higher layer signaling; and means for encoding, at the gNB, a CSI-RS for transmission to the UE using the CSI-RS resource defined by the CSI-RS RE mapping configuration.

Example 27 includes the gNB of Example 26, further comprising: means for selecting a location for the CSI-RS resource based on the CSI-RS RE mapping configuration that indicates that the CSI-RS resource occupies identical frequency domain resources in occupied orthogonal frequency division multiplexing (OFDM) symbols.

Example 28 includes the gNB of any of Examples 26 to 27, further comprising: means for encoding the CSI-RS RE mapping configuration for transmission to the UE, wherein the CSI-RS RE mapping configuration includes a bitmap that indicates the frequency domain location of the CSI-RS resource, wherein the bitmap is provided by a CSI-RS resource mapping (CSI-RS-ResourceMapping) higher-layer parameter in the CSI-RS RE mapping configuration; and means for forming the bitmap using a number of bits that is reduced based on an actual number of symbols used for the transmission of the CSI-RS to the UE, wherein the number of bits is 12/Y, wherein the CSI-RS resource constitutes of one or more CSI-RS resource components with (k, l), with k adjacent REs in a frequency domain and k adjacent REs in a time domain, and a bit set to '1' indicates a start of the CSI-RS resource component (k, l).

Example 29 includes the gNB of any of Examples 26 to 28, further comprising: means for encoding the CSI-RS for transmission to the UE in accordance with a code division multiplexing (CDM) group with a size selected from a set of {1, 2, 4, 8}; and means for limiting the CDM group to co-located REs in the frequency domain and the time domain.

Example 30 includes the gNB of any of Examples 26 to 29, further comprising: means for identifying the resource elements for the CSI-RS resource, wherein a CSI-RS code division multiplexing (CDM)-8 (CDM-8) is applied using two frequency domain resource elements (FD2) and four time domain resource elements (TD4) when a number of antenna ports is equal to 32, wherein the two frequency domain resource elements (FD2) are adjacent and the four time domain resource elements (TD4) are adjacent.

Example 31 includes the gNB of any of Examples 26 to 30, further comprising: means for encoding the CSI-RS RE mapping configuration for transmission to the UE, wherein the CSI-RS RE mapping configuration includes an indication of sub-bands which are configured for the transmission of the CSI-RS to the UE.

Example 32 includes the gNB of any of Examples 26 to 31, further comprising: means for encoding an indication of a code division multiplexing (CDM) type for transmission to the UE, wherein the CDM type includes two bits for a frequency domain CDM value from a set of {1, 2, 4, 8} and two bits for a time domain CDM value from the set of {1, 2, 4, 8}.

Various techniques, or certain aspects or portions thereof, may take the form of program code (i.e., instructions) embodied in tangible media, such as floppy diskettes, compact disc-read-only memory (CD-ROMs), hard drives, non-transitory computer readable storage medium, or any other machine-readable storage medium wherein, when the program code is loaded into and executed by a machine, such as a computer, the machine becomes an apparatus for practicing the various techniques. In the case of program code execution on programmable computers, the computing device may include a processor, a storage medium readable by the processor (including volatile and non-volatile memory and/or storage elements), at least one input device, and at least one output device. The volatile and non-volatile memory and/or storage elements may be a random-access memory (RAM), erasable programmable read only memory (EPROM), flash drive, optical drive, magnetic hard drive, solid state drive, or other medium for storing electronic data.

The node and wireless device may also include a transceiver module (i.e., transceiver), a counter module (i.e., counter), a processing module (i.e., processor), and/or a clock module (i.e., clock) or timer module (i.e., timer). In one example, selected components of the transceiver module can be located in a cloud radio access network (C-RAN). One or more programs that may implement or utilize the various techniques described herein may use an application programming interface (API), reusable controls, and the like. Such programs may be implemented in a high level procedural or object oriented programming language to communicate with a computer system. However, the program(s) may be implemented in assembly or machine language, if desired. In any case, the language may be a compiled or interpreted language, and combined with hardware implementations.

As used herein, the term "circuitry" may refer to, be part of, or include an Application Specific Integrated Circuit (ASIC), an electronic circuit, a processor (shared, dedicated, or group), and/or memory (shared, dedicated, or group) that execute one or more software or firmware programs, a combinational logic circuit, and/or other suitable hardware components that provide the described functionality. In some embodiments, the circuitry may be implemented in, or functions associated with the circuitry may be implemented by, one or more software or firmware modules. In some embodiments, circuitry may include logic, at least partially operable in hardware.

It should be understood that many of the functional units described in this specification have been labeled as modules, in order to more particularly emphasize their implementation independence. For example, a module may be implemented as a hardware circuit comprising custom very-large-scale integration (VLSI) circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in software for execution by various types of processors. An identified module of executable code may, for instance, comprise one or more physical or logical blocks of computer instructions, which may, for instance, be organized as an object, procedure, or function. Nevertheless, the executables of an identified module may not be physically located together, but may comprise disparate instructions stored in different locations which, when joined logically together, comprise the module and achieve the stated purpose for the module.

Indeed, a module of executable code may be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices, and may exist, at least partially, merely as electronic signals on a system or network. The modules may be passive or active, including agents operable to perform desired functions.

Reference throughout this specification to "an example" or "exemplary" means that a particular feature, structure, or characteristic described in connection with the example is included in at least one embodiment of the present technology. Thus, appearances of the phrases "in an example" or the word "exemplary" in various places throughout this specification are not necessarily all referring to the same embodiment.

As used herein, a plurality of items, structural elements, compositional elements, and/or materials may be presented in a common list for convenience. However, these lists should be construed as though each member of the list is individually identified as a separate and unique member. Thus, no individual member of such list should be construed as a de facto equivalent of any other member of the same list solely based on their presentation in a common group without indications to the contrary. In addition, various embodiments and example of the present technology may be referred to herein along with alternatives for the various components thereof. It is understood that such embodiments, examples, and alternatives are not to be construed as defacto equivalents of one another, but are to be considered as separate and autonomous representations of the present technology.

Furthermore, the described features, structures, or characteristics may be combined in any suitable manner in one or more embodiments. In the following description, numerous specific details are provided, such as examples of layouts, distances, network examples, etc., to provide a thorough understanding of embodiments of the technology. One skilled in the relevant art will recognize, however, that the technology can be practiced without one or more of the specific details, or with other methods, components, layouts, etc. In other instances, well-known structures, materials, or operations are not shown or described in detail to avoid obscuring aspects of the technology.

While the forgoing examples are illustrative of the principles of the present technology in one or more particular applications, it will be apparent to those of ordinary skill in the art that numerous modifications in form, usage and details of implementation can be made without the exercise of inventive faculty, and without departing from the principles and concepts of the technology.

What is claimed is:

1. A base station operable to communicate a channel state information reference signal (CSI-RS) resource element (RE) mapping configuration to a user equipment (UE), the apparatus comprising:
   one or more processors configured to:
   determine, at the base station, a CSI-RS RE mapping configuration that identifies resource elements for a CSI-RS resource at a frequency domain location (k) and at a time domain location (l);
   identify the resource elements for the CSI-RS resource, wherein a CSI-RS code division multiplexing (CDM)-8 (CDM-8) is applied using two frequency domain resource elements (FD2) and four time domain resource elements (TD4) when a number of antenna ports is equal to 32;
   encode, at the base station, the CSI-RS RE mapping configuration for transmission to the UE via higher layer signaling; and
   a memory interface configured to retrieve from a memory the CSI-RS RE mapping configuration.

2. The base station of claim 1, wherein the one or more processors are further configured to encode a CSI-RS for transmission to the UE using the CSI-RS resource defined by the CSI-RS RE mapping configuration.

3. The base station of claim 1, wherein the one or more processors are further configured to select a location for the CSI-RS resource based on the CSI-RS RE mapping configuration that indicates that the CSI-RS resource occupies identical frequency domain resources in occupied orthogonal frequency division multiplexing (OFDM) symbols.

4. The base station of claim 1, wherein the one or more processors are further configured to encode the CSI-RS RE mapping configuration for transmission to the UE, wherein the CSI-RS RE mapping configuration includes a bitmap that indicates the frequency domain location of the CSI-RS resource, wherein the bitmap is provided by a CSI-RS resource mapping (CSI-RS-ResourceMapping) higher-layer parameter in the CSI-RS RE mapping configuration.

5. The base station of claim 4, wherein the one or more processors are further configured to form the bitmap using a number of bits that is reduced based on an actual number of symbols used for the transmission of the CSI-RS to the UE.

6. The base station of claim 1, wherein the one or more processors are further configured to encode the CSI-RS for transmission to the UE in accordance with a CDM group with a size selected from a set of $\{1, 2, 4, 8\}$.

7. The base station of claim 6, wherein the one or more processors are further configured to limit the CDM group to co-located REs in the frequency domain and the time domain.

8. The base station of claim 1, wherein the FD2 are adjacent and the TD4 are adjacent.

9. The base station of claim 1, wherein the resource elements are within resource blocks occupied by the CSI-RS resource which is configured for the UE.

10. The base station of claim 1, wherein the one or more processors are further configured to encode the CSI-RS RE mapping configuration for transmission to the UE, wherein the CSI-RS RE mapping configuration includes an indication of sub-bands which are configured for the transmission of the CSI-RS to the UE.

11. The base station of claim 1, wherein the one or more processors are further configured to encode the CSI-RS RE mapping configuration for transmission to the UE, wherein the CSI-RS RE mapping configuration includes a second bitmap that indicates a time-domain location of the CSI-RS resource, wherein the second bitmap is provided by a CSI-RS resource mapping (CSI-RS-ResourceMapping) higher-layer parameter in the CSI-RS RE mapping configuration.

12. The base station of claim 1, wherein the one or more processors are further configured to encode an indication of a CDM type for transmission to the UE, wherein the CDM type includes two bits for a frequency domain CDM value from a set of $\{1, 2, 4, 8\}$ and two bits for a time domain CDM value from the set of $\{1, 2, 4, 8\}$.

13. A user equipment (UE) operable to decode a channel state information reference signal (CSI-RS) resource element (RE) mapping configuration received from a base station, the apparatus comprising:
   one or more processors configured to:
   decode, at the UE, a CSI-RS RE mapping configuration received from the base station via radio resource control (RRC) signaling, wherein the CSI-RS RE mapping configuration identifies resource elements for a CSI-RS resource at a frequency domain location (k) and at a time domain location (l), and wherein a CSI-RS code division multiplexing (CDM)-8 (CDM-8) is applied using two frequency domain resource elements (FD2) and four time domain resource elements (TD4) when a number of antenna ports is equal to 32; and
   decode, at the UE, a CSI-RS received from the base station using the CSI-RS RE mapping configuration that defines the CSI-RS resource for the CSI-RS; and a memory interface configured to send to a memory the CSI-RS RE mapping configuration.

14. The UE of claim 13, wherein the one or more processors are further configured to:
decode the CSI-RS RE mapping configuration received from the base station, wherein the CSI-RS RE mapping configuration includes a bitmap that indicates the frequency domain location of the CSI-RS resource, wherein the bitmap is provided by a CSI-RS resource mapping (CSI-RS-ResourceMapping) higher-layer parameter in the CSI-RS RE mapping configuration; or
decode the CSI-RS received from the base station in accordance with a code division multiplexing (CDM) group with a size selected from a set of $\{1, 2, 4, 8\}$.

15. The UE of claim 13, wherein the CSI-RS resource constitutes of one or more CSI-RS resource components with (k, l), where a starting sub-carrier index of a (k, l) CSI-RS component is an integral multiple of k, wherein aggregated CSI-RS resource components occupy identical frequency domain resources in occupied orthogonal frequency division multiplexing (OFDM) symbols.

16. The UE of claim 13, wherein the one or more processors are further configured to decode the CSI-RS RE mapping configuration received from the base station, wherein the CSI-RS RE mapping configuration includes a second bitmap that indicates a time-domain location of the CSI-RS resource, wherein the second bitmap is provided by a CSI-RS resource mapping (CSI-RS-ResourceMapping) higher-layer parameter in the CSI-RS RE mapping configuration.

17. At least one non-transitory machine readable storage medium having instructions embodied thereon for communicating a channel state information reference signal (CSI-RS) resource element (RE) mapping configuration from a base station to a user equipment (UE), the instructions when executed by one or more processors at the base station perform the following:
determining, at the base station, a CSI-RS RE mapping configuration that identifies resource elements for a CSI-RS resource at a frequency domain location (k) and at a time domain location (l);
identifying the resource elements for the CSI-RS resource, wherein a CSI-RS code division multiplexing (CDM)-8 (CDM-8) is applied using two frequency domain resource elements (FD2) and four time domain resource elements (TD4) when a number of antenna ports is equal to 32;
encoding, at the base station, the CSI-RS RE mapping configuration for transmission to the UE via higher layer signaling; and
encoding, at the base station, a CSI-RS for transmission to the UE using the CSI-RS resource defined by the CSI-RS RE mapping configuration.

18. The at least one non-transitory machine readable storage medium of claim 17, further comprising instructions when executed perform the following: selecting a location for the CSI-RS resource based on the CSI-RS RE mapping configuration that indicates that the CSI-RS resource occupies identical frequency domain resources in occupied orthogonal frequency division multiplexing (OFDM) symbols.

19. The at least one non-transitory machine readable storage medium of claim 17, further comprising instructions when executed perform the following:
encoding the CSI-RS RE mapping configuration for transmission to the UE, wherein the CSI-RS RE mapping configuration includes a bitmap that indicates the frequency domain location of the CSI-RS resource, wherein the bitmap is provided by a CSI-RS resource mapping (CSI-RS-ResourceMapping) higher-layer parameter in the CSI-RS RE mapping configuration; and
forming the bitmap using a number of bits that is reduced based on an actual number of symbols used for the transmission of the CSI-RS to the UE, wherein the CSI-RS resource constitutes of one or more CSI-RS resource components with (k, l), with k adjacent REs in a frequency domain and k adjacent REs in a time domain, and a bit set to '1' indicates a start of the CSI-RS resource component (k, l).

20. The at least one non-transitory machine readable storage medium of claim 17, further comprising instructions when executed perform the following:
encoding the CSI-RS for transmission to the UE in accordance with a CDM group with a size selected from a set of $\{1, 2, 4, 8\}$; and
limiting the CDM group to co-located REs in the frequency domain and the time domain.

21. The at least one non-transitory machine readable storage medium of claim 17, further comprising instructions when executed perform the following: encoding the CSI-RS RE mapping configuration for transmission to the UE, wherein the CSI-RS RE mapping configuration includes an indication of sub-bands which are configured for the transmission of the CSI-RS to the UE.

22. The at least one non-transitory machine readable storage medium of claim 17, further comprising instructions when executed perform the following: encoding an indication of a CDM type for transmission to the UE, wherein the CDM type includes two bits for a frequency domain CDM value from a set of $\{1, 2, 4, 8\}$ and two bits for a time domain CDM value from the set of $\{1, 2, 4, 8\}$.

* * * * *